US008838784B1

(12) United States Patent
Kalavade

(10) Patent No.: US 8,838,784 B1
(45) Date of Patent: Sep. 16, 2014

(54) METHOD AND APPARATUS FOR PRIVACY-SAFE ACTIONABLE ANALYTICS ON MOBILE DATA USAGE

(75) Inventor: Asawaree Kalavade, Acton, MA (US)

(73) Assignee: Zettics, Inc., Concord, MA (US)

( * ) Notice: Subject to any disclaimer, the term of this patent is extended or adjusted under 35 U.S.C. 154(b) by 0 days.

(21) Appl. No.: 13/198,290

(22) Filed: Aug. 4, 2011

Related U.S. Application Data

(60) Provisional application No. 61/370,583, filed on Aug. 4, 2010.

(51) Int. Cl.
 *G06F 15/173* (2006.01)
(52) U.S. Cl.
 USPC .......................................................... 709/224
(58) Field of Classification Search
 USPC ..................... 709/252, 230, 235, 224; 726/26
 See application file for complete search history.

(56) References Cited

U.S. PATENT DOCUMENTS

| | | | |
|---|---|---|---|
| 6,442,529 B1 | 8/2002 | Krishan et al. | |
| 6,442,687 B1 | 8/2002 | Savage | |
| 6,611,867 B1 | 8/2003 | Bowman-Amuah | |
| 6,662,195 B1 | 12/2003 | Langseth et al. | |
| 6,757,543 B2 | 6/2004 | Moran et al. | |
| 6,834,195 B2 | 12/2004 | Brandenberg et al. | |
| 6,894,994 B1 | 5/2005 | Grob et al. | |
| 6,993,590 B1 * | 1/2006 | Gauthier et al. | 709/231 |
| 7,065,070 B1 | 6/2006 | Chang | |
| 7,080,139 B1 | 7/2006 | Briggs et al. | |
| 7,209,734 B2 | 4/2007 | Maes | |
| 7,213,032 B2 | 5/2007 | Mascarenhas | |
| 7,242,294 B2 | 7/2007 | Warrior et al. | |
| 7,257,546 B2 | 8/2007 | Ebrahimi et al. | |
| 7,328,262 B2 | 2/2008 | McDonagh et al. | |
| 7,340,438 B2 | 3/2008 | Nordman et al. | |
| 7,415,711 B2 | 8/2008 | Chew et al. | |

(Continued)

FOREIGN PATENT DOCUMENTS

| | | |
|---|---|---|
| WO | WO-2009070748 | 6/2009 |
| WO | WO-2009120892 | 10/2009 |

OTHER PUBLICATIONS

"Arbor e100—Unmatched Scale and Intelligence in a Broadband Service Optimization Platform" Arbor Networks, Inc. 1999-2000. (4 pages).

(Continued)

*Primary Examiner* — Nicholas Jensen
*Assistant Examiner* — Syed S Ali
(74) *Attorney, Agent, or Firm* — Wilmer Cutler Pickering Hale and Dorr LLP

(57) ABSTRACT

System and method for capturing, analyzing, and accessing application level activity and other user information on a mobile data network based on various privacy controls. A platform non-intrusively and transparently monitors data activity on a mobile data network in real-time. The platform comprises collectors, data managers, and a reports manager. The collectors capture information from routers and correlate IP addresses with phone numbers. The collectors retain data allowed by a set of capture filter rules. Data managers receive the retained data and augment it with additional information. A set of usage filter rules determines the communications and additional information that can go to each data manager for use in real-time reports on aggregated usage of the network. The report manager works with the data manager to provide real-time reports to an operator. A set of access usage rules determines the reports that the operator can access.

10 Claims, 34 Drawing Sheets

(56) References Cited

U.S. PATENT DOCUMENTS

| | | | |
|---|---|---|---|
| 7,444,655 B2 | 10/2008 | Sardera | |
| 7,463,898 B2 | 12/2008 | Bayne | |
| 7,464,187 B2 | 12/2008 | Glommen et al. | |
| 7,505,765 B2 | 3/2009 | Frangione et al. | |
| 7,551,913 B1 | 6/2009 | Chien | |
| 7,590,547 B2 | 9/2009 | Lagadec et al. | |
| 7,660,581 B2 | 2/2010 | Ramer et al. | |
| 7,676,217 B2 | 3/2010 | Zhu et al. | |
| 7,689,432 B2 | 3/2010 | Gross | |
| 7,689,682 B1 | 3/2010 | Eldering et al. | |
| 7,698,422 B2 | 4/2010 | Vanderhook et al. | |
| 7,783,739 B1 | 8/2010 | Weigle | |
| 7,796,578 B2 | 9/2010 | Stafford | |
| 7,801,058 B2 | 9/2010 | Wang | |
| 7,865,187 B2 | 1/2011 | Ramer et al. | |
| 7,890,581 B2 | 2/2011 | Rao et al. | |
| 7,895,234 B2 | 2/2011 | Lillie et al. | |
| 8,032,564 B2 | 10/2011 | Muret et al. | |
| 8,108,517 B2 | 1/2012 | Kalavade et al. | |
| 8,195,661 B2 | 6/2012 | Kalavade et al. | |
| 8,433,804 B2 | 4/2013 | Swanburg et al. | |
| 2001/0036224 A1 | 11/2001 | Demello et al. | |
| 2002/0147766 A1 | 10/2002 | Vanska et al. | |
| 2002/0174073 A1 | 11/2002 | Nordman et al. | |
| 2003/0087652 A1 | 5/2003 | Simon et al. | |
| 2003/0126613 A1 | 7/2003 | McGuire | |
| 2003/0158855 A1 | 8/2003 | Farnham et al. | |
| 2004/0098625 A1 | 5/2004 | Lagadec et al. | |
| 2004/0122730 A1 | 6/2004 | Tucciarone et al. | |
| 2005/0164704 A1 | 7/2005 | Winsor | |
| 2005/0235030 A1 | 10/2005 | Lauckhart et al. | |
| 2006/0026438 A1 | 2/2006 | Stern et al. | |
| 2006/0123105 A1 | 6/2006 | Parekh et al. | |
| 2006/0174028 A1* | 8/2006 | Zhu | 709/232 |
| 2006/0184670 A1 | 8/2006 | Beeson et al. | |
| 2007/0008885 A1 | 1/2007 | Bonner | |
| 2007/0016918 A1 | 1/2007 | Alcorn et al. | |
| 2007/0088821 A1 | 4/2007 | Sankuratripati et al. | |
| 2007/0100653 A1* | 5/2007 | Ramer et al. | 705/1 |
| 2007/0150349 A1 | 6/2007 | Handel et al. | |
| 2007/0189473 A1 | 8/2007 | Altberg et al. | |
| 2007/0244750 A1* | 10/2007 | Grannan et al. | 705/14 |
| 2007/0255701 A1 | 11/2007 | Halla et al. | |
| 2007/0260519 A1 | 11/2007 | Sattley et al. | |
| 2008/0028067 A1 | 1/2008 | Berkhin et al. | |
| 2008/0034088 A1 | 2/2008 | Suresh | |
| 2008/0091489 A1 | 4/2008 | LaRock et al. | |
| 2008/0103850 A1 | 5/2008 | Shen | |
| 2008/0214157 A1 | 9/2008 | Ramer et al. | |
| 2008/0220760 A1 | 9/2008 | Ullah | |
| 2008/0275748 A1 | 11/2008 | John | |
| 2009/0048911 A1 | 2/2009 | Shenfield et al. | |
| 2009/0052454 A1 | 2/2009 | Pourcher et al. | |
| 2009/0129377 A1 | 5/2009 | Chamberlain et al. | |
| 2009/0138427 A1 | 5/2009 | Kalavade | |
| 2009/0138446 A1 | 5/2009 | Kalavade et al. | |
| 2009/0138447 A1 | 5/2009 | Kalavade et al. | |
| 2009/0138593 A1* | 5/2009 | Kalavade | 709/224 |
| 2009/0181649 A1 | 7/2009 | Bull et al. | |
| 2009/0210928 A1 | 8/2009 | Ourega | |
| 2009/0216682 A1 | 8/2009 | Foladare et al. | |
| 2009/0247193 A1 | 10/2009 | Kalavade et al. | |
| 2009/0248680 A1 | 10/2009 | Kalavade et al. | |
| 2010/0031274 A1 | 2/2010 | Sim-Tang | |
| 2010/0278068 A1 | 11/2010 | Nobert et al. | |
| 2011/0085654 A1* | 4/2011 | Jana et al. | 379/220.01 |
| 2012/0147769 A1 | 6/2012 | Kalavade et al. | |
| 2012/0179534 A1* | 7/2012 | Moukas et al. | 705/14.41 |
| 2012/0221570 A1 | 8/2012 | Kalavade et al. | |
| 2013/0191416 A1* | 7/2013 | Lee et al. | 707/771 |
| 2013/0291060 A1* | 10/2013 | Moore | 726/1 |

OTHER PUBLICATIONS

International Search Report and Written Opinion issued for PCT/US2009/038443, dated May 27, 2009 (7 pages).

International Search Report and Written Opinion, International Patent Application No. PCT/US08/85000, mailed Jan. 28, 2009 (8 pages).

\* cited by examiner

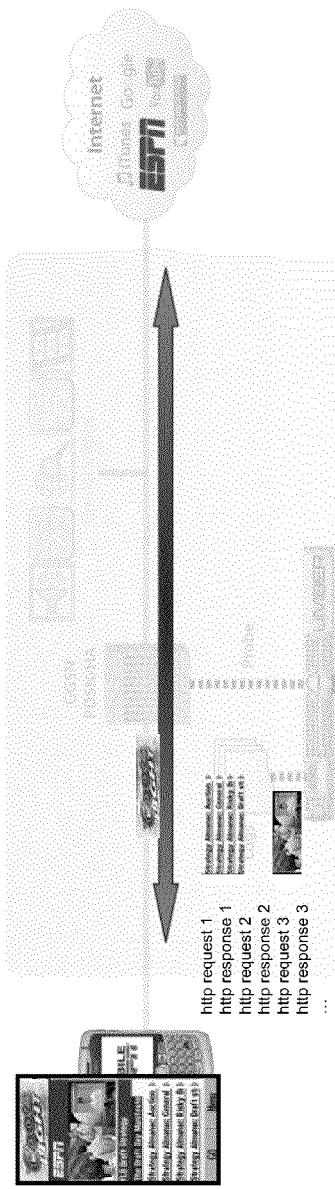

1. COLLECT TRANSACTIONS: On-deck and Off-deck, Web, Apps, Video, SMS, All Devices 2. CORRELATE EVENT: Privacy Filters, Correlate request/response 3. REDUCED EVENT: <masked ID, app=web, dest={ESPN}, ad={coors}, device=d1, loc=L1, nw=n1)

4. ENRICHED EVENT: <masked ID, app=web, dest={ESPN, sports}, ad={coors}, Android X, camera, loc=Boston, nw=3.5G)

<ID1, web, cnn.com/tennis, sports, iPhone, camera, Boston>
<ID1, video, youtube.com, iPhone, camera, San Francisco>
<ID2, appDownload, android Market, Google Maps, Android X, San Francisco>
...

| Carrier Controls | User Controls |
| --- | --- |

1720  1730

Capture Filters

| Usage Controls |
| Access Controls |

Capture Filter Controls  1818

| | | |
| --- | --- | --- |
| 1811 | Default URL Depth | 1 (TLD only) |
| 1812 | On-deck URL Depth | 5 |
| 1813 | AppStore URL Depth | 5 |
| 1814 | Blacklist | Medical Category |
| 1815 | White List: | |
| | Search Strings | Use |
| | Ads | Use |

| | |
|---|---|
| Default URL depth | 1 (TLD only) |
| On-deck URL depth | 5 |
| Blacklist | Medical Category, Location |
| Appstore | Use |
| Whitelist: | |
| Search strings | Use |
| Ads | Use |

OUTPUT FROM DPI

1910 1. http://api.facebook.com/restserver.php?api_key=88 2a8490361da98702bf97a021ddc14d&call_id=127398 9691456&format=JSON&method=fql.query&query=SELECT+uid%2Cfirst_name%2Clast_name%2Cstatus%2C pic_square+FROM+user+WHERE+%28%28uid+IN+%28S ELECT+uid2+FROM+friend+WHERE 200 application/json

1920 2. http://xml.weather.com/weather/local/89410?cc=*& dayd=2&dayf=11&eloc=true

1930 3. http://carrier.com/on-deck/x/video/football/video.1

1940 4. http://android.clients.google.com/market/download /Download?assetId=304463000829

1950 5. http://www.google.com/search?as_q=nintendo&as_ eq=wii@as_sitesearch=.com

1960 6. http://mmv.admob.com/p/i/66/33/6633481234495c5 12f8ddf9896ea41a6.png

DATA FILTERED AND USED BY COLLECTOR facebook.com weather.com carrier.com/on-deck/x/video/football/video.1 android.clients.google.com/market/download/Do wnload?assetId=304463000829 www.google.com/search?as_q=nintendo&as_e q=wii@as_sitesearch=.com mmv.admob.com/p/i/66/33/6633481234495c51 2f8ddf9896ea41a6.png

Figure 19

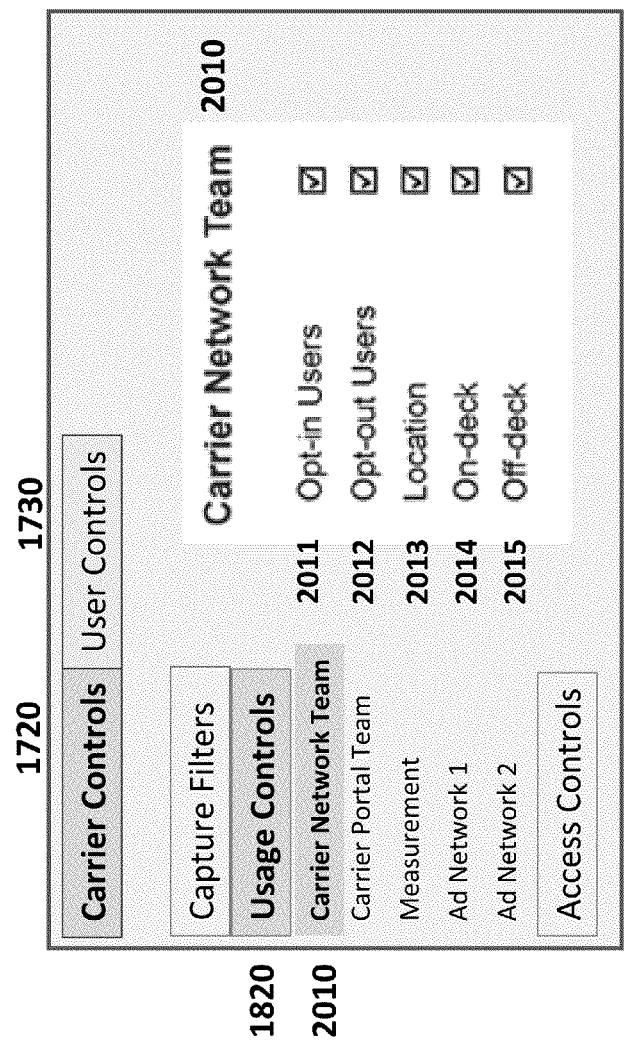
Figure 20-a

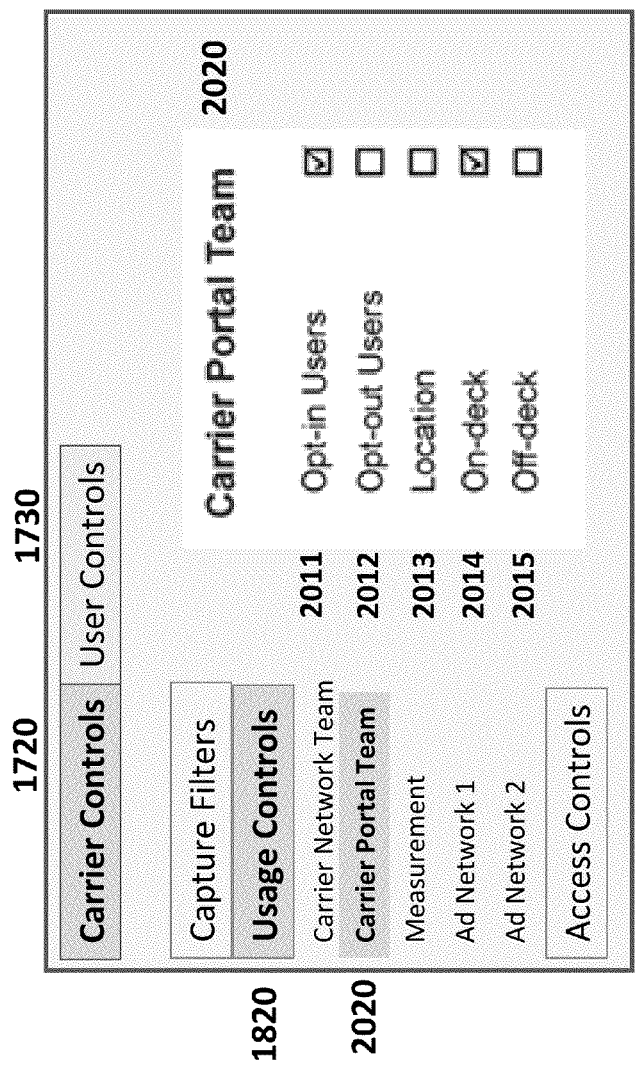
Figure 20-b

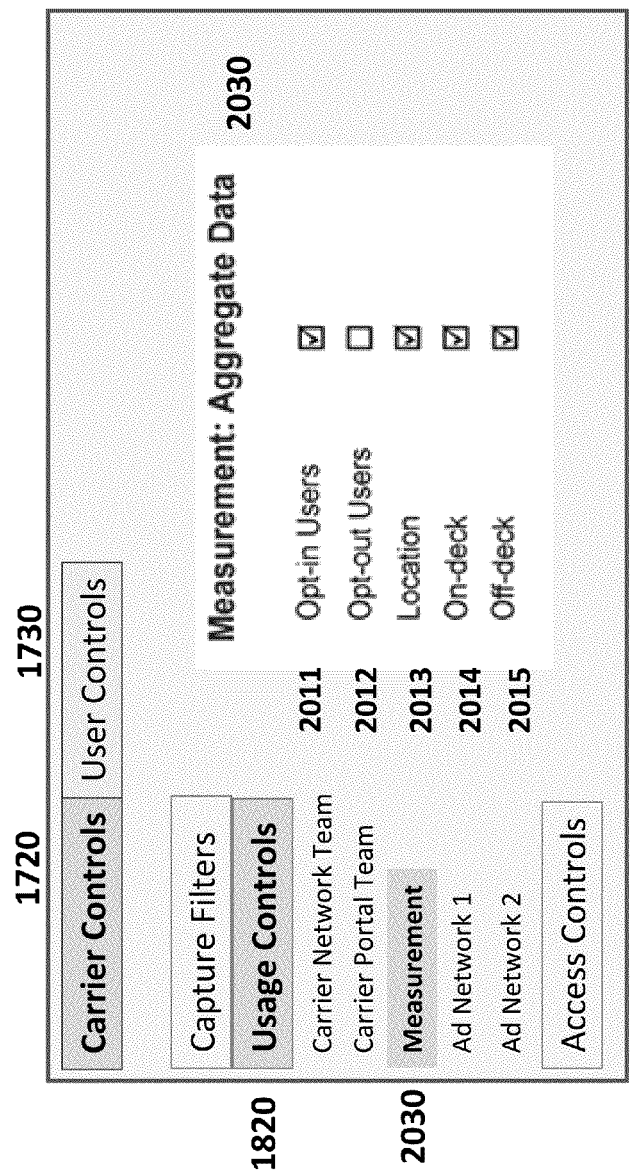
Figure 20-c

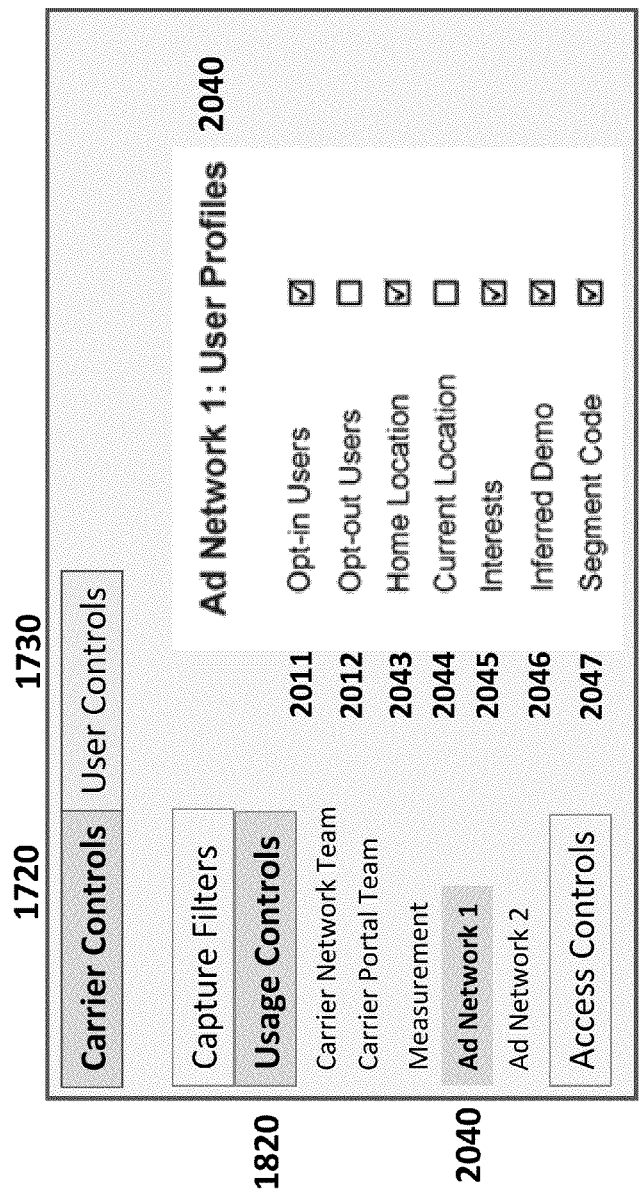
Figure 20-d

METHOD AND APPARATUS FOR PRIVACY-SAFE ACTIONABLE ANALYTICS ON MOBILE DATA USAGE

CROSS REFERENCE TO RELATED APPLICATIONS

This application claims priority under 35 U.S.C. §119(e) to U.S. Provisional Application Ser. No. 61/370,583, filed on Aug. 4, 2010 entitled "Method and Apparatus for Privacy-Safe Actionable Analytics on Mobile Data Usage," the disclosure of which is hereby incorporated by reference in its entirety.

This application is related to the following applications, the entire contents of which are incorporated by reference:

U.S. patent application Ser. No. 12/324,672, entitled "System and Method for Collecting, Reporting, and Analyzing Data on Application-Level Activity and Other User Information on a Mobile Data Network," filed Nov. 26, 2008;

U.S. patent application Ser. No. 12/324,675, entitled "Method and Apparatus for Real-Time Collection of Information about Application Level Activity and Other User Information on a Mobile Data Network," filed Nov. 26, 2008;

U.S. patent application Ser. No. 12/324,671, entitled "Method and Apparatus for Storing Data on Application-Level Activity and Other User Information to Enable Real-Time Multi-Dimensional Reporting about User of a Mobile Data Network," filed Nov. 26, 2008;

U.S. patent application Ser. No. 12/324,611, entitled "Method and Apparatus for Real-Time Multi-Dimensional Reporting and Analyzing of Data on Application Level Activity and Other User Information on a Mobile Data Network," filed Nov. 26, 2008;

U.S. patent application Ser. No. 12/412,273, entitled "System and Method for Sharing Anonymous User Profiles with a Third Party," filed Mar. 26, 2009; and U.S. patent application Ser. No. 12/412,276, entitled "System and Method for Creating Anonymous User Profiles from a Mobile Data Network," filed Mar. 26, 2009.

BACKGROUND

1. Technical Field

The present invention relates generally to privacy-safe actionable analytics on mobile data usage.

2. Description of the Related Art

Traditionally, mobile operators have had very tight control on the content that was being accessed on their networks and used to limit user access to a 'walled garden' or 'on-deck content'. This was done for two reasons: to optimize their network for well-understood content, and to control user experience. With the advent of more open devices and faster networks, there is an increasing trend in the mobile community to access 'off-deck' or 'off-portal' content, which is content generally available on the Internet at large and not preselected content hosted by the operator. This movement is generally troubling to service providers for two reasons. First, service providers have very limited visibility in the usage of off-deck content and hence they don't have the ability to design and optimize their networks for this usage. Further, they also no longer have the ability to control what their users access and hence they fear becoming 'dumb pipes' and not participating in the whole movement towards advertising and monetizing Internet content.

Content providers on the other hand, are interested in the potentially huge increased customer base of mobile users. Further, the mobile device is highly personal and by getting specific information about users such as location, demographics, usage patterns, etc. they can generate very targeted content and advertising. However, they too lack detailed visibility about mobile users or about what is happening in the mobile network. While a client on the mobile handset could provide some of this, they can't put clients or other applications into mobile devices easily to get additional data since these devices are still fairly rudimentary in comparison with a PC. Also, due to the traditional lock-in on the devices from a mobile operator, the client on the device may not provide all the detailed information. For instance, user location is not easily exposed by carriers since they are concerned about privacy and its usage and also since its such a critical part of the carrier data. Recent developments such as the Android open platform from Google are attempts to open up some of this information. However, it is still up to the carriers to allow these devices on their networks and for device manufacturers to use this platform. Further, this restricts the ability of data collection only to the new devices that embrace this platform—a carriers network will continue to have many other devices as well.

A key requirement to enable these two silos—mobile carriers and content providers—to jointly evolve the mobile content ecosystem is to mine and share mobile content usage effectively. By getting visibility into off-deck mobile content usage, mobile operators can optimize their networks. Mobile carriers are sitting on a goldmine of data that includes user's location, access patterns, demographic information, etc. By systematically sharing information between mobile operators and content providers, it is possible to offer very targeted and relevant content to the users.

Mobile data usage is increasing, due to the availability of higher speed networks, more capable and advanced devices, and increasing trend towards operators offering flat-rate data plans. As a result, there is a growing momentum towards using rich media content on mobile devices. This opens up a huge possibility of advertising and personalization around this mobile content. However, this also causes an increased concern with privacy issues.

SUMMARY

The present invention provides a system and method for capturing, analyzing, and accessing application-level activity and other user information on a mobile data network based on various privacy controls.

In one aspect of the invention, a platform non-intrusively and transparently monitors data activity on a mobile data network in real-time so that it can be reported to an operator. The platform comprises a plurality of collectors, a plurality of data managers, and a report manager. The collectors communicate with routers to receive data communications and inspect the communications for source IP addresses, which are then correlated to phone numbers. The collectors only retain the data allowed by a set of capture filter rules. The data managers receive the collected data and augment it with additional information associated with each phone number. A set of usage filter rules determines the communications and associated additional information that each data manager can use in real-time reports on aggregated usage of the network. The report manager works with the data manager to provide reports to an operator. A set of access filter rules specify the reports that the operator can view.

In another aspect of the invention, the usage filter rules specify the communications and associated additional information that can be aggregated in a data manager based on the applications that are used in that data manager.

In another aspect of the invention, the usage filter rules allow an end user to remove some of his own information before the data managers aggregate it. The end user may also choose to remove some of his own information from aggregation for only specific applications.

In another aspect of the invention, access filter rules specify who can see real-time reports based on whether the operator has individual rights or is part of a group with certain rights.

In another aspect of the invention, the granularity of the capture filter rules, usage filter rules, or access filter rules can be adjusted to filter more or less data.

BRIEF DESCRIPTION OF THE DRAWINGS

For a more complete understanding of the preferred embodiment of the present invention and the advantages thereof, reference is now made to the following descriptions taken in conjunction with the accompanying drawings, in which:

FIG. 12 shows an example of the collection process;

FIG. 18 shows an example of the Carrier Filters component of the Privacy Dial;

FIG. 19 shows details on the operation of the Carrier Filters;

FIG. 20 shows an example of Usage controls of the Privacy Dial;

DETAILED DESCRIPTION

Figure 1:
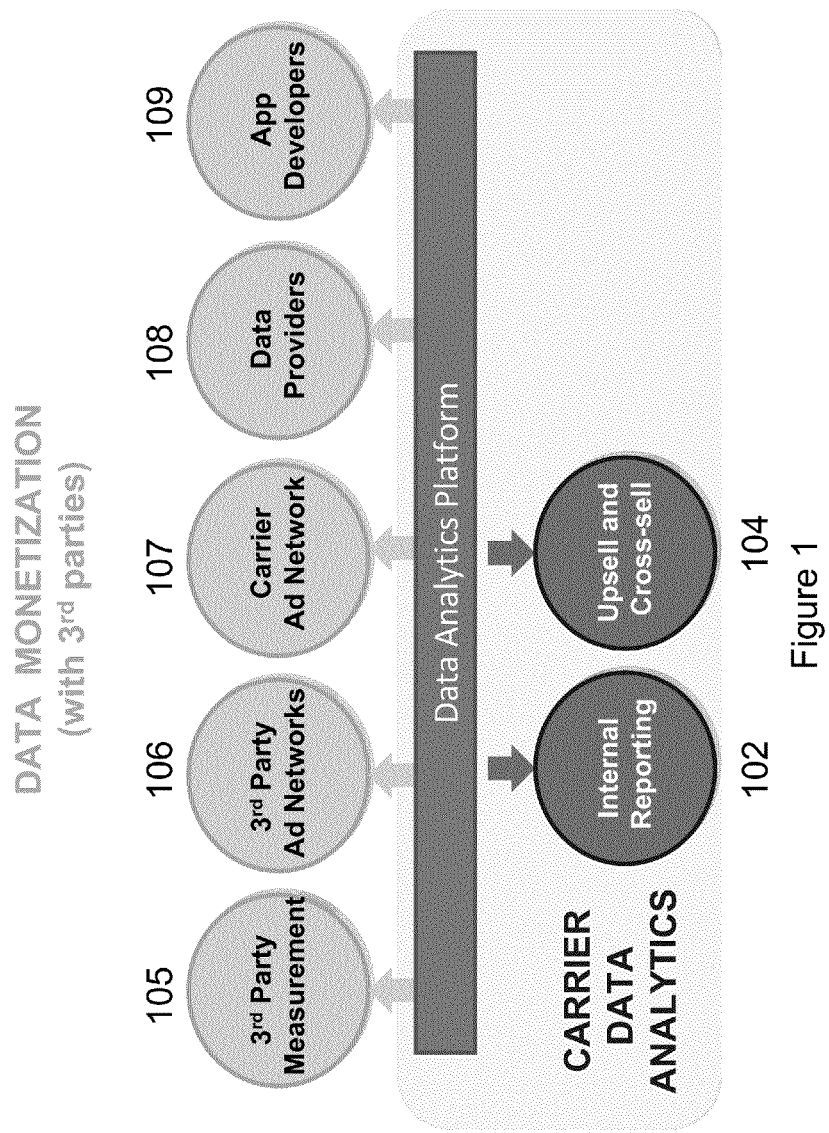
FIG. 1 illustrates several applications possible out of mobile data usage in the preferred embodiment.

There are many broad applications that can be built around mobile usage analysis. FIG. 1 shows an example of several of these applications in the preferred embodiment of the invention.

1. Carrier internal reporting 102: This helps carriers understand their existing usage in order to help with marketing, security, business development, network planning, etc.
2. Carrier promotions 104: This helps carriers identify key apps and users for up-sell and cross-sell opportunities
3. Third party measurement services 105: Aggregated Mobile usage data observed inside the carrier network can be normalized and offered to publishers and media either directly by the carrier or syndicated via third party measurement providers (e.g. Nielsen, Comscore). These media and publishers require this information for product development as well as campaign and media planning
4. Third party ad networks 106: As advertising is moving to mobile, existing ad networks are looking to improve the effectiveness of mobile ads. User-level segments and profiles can be developed that can enable targeting of mobile ads. This information can be fed by a carrier into existing third party ad networks (e.g. Google, Apple).
5. Carrier ad network 107: This allows carriers to develop a stand-alone ad network which can leverage the targeting information for delivering appropriate ads.
6. Data Providers 108: Existing off-line data providers (e.g. Acxiom, Experian) have developed rich user profiles collecting user's off-line activities. As usage moves on-line, these providers are increasingly looking to generate profiles of user's on-line and mobile activities. It is possible for carriers to provide mobile usage, either at a segment level or at a user level, to these data providers.
7. Third party application developers 109: third party app developers often require detailed usage information to offer better apps. Carriers can efficiently broker usage data profiles for this purpose.

As described above, a large number of applications can be enabled from mobile usage information. The preferred embodiment of this invention describes a method and apparatus so that usage information can be extracted from the carrier network and used in these applications. Further, it is critical that privacy constraints be adhered to as this data is used. The preferred embodiment of this invention includes a Privacy Dial that allows full control on the capture, use, and access of this information in a privacy-save way.

The preferred embodiment of this invention comprises 3 key elements, each of which has a unique capability in the category. In addition, none of the prior art offers a solution that encompasses all these capabilities. These include: capture, analytics, and use of data.

Capture:

Existing data collection approaches within the carrier network typically are silo'ed and mostly built around ad-hoc integration of data sources. The approach described in the preferred embodiment of this invention offers a platform that allows integration of data from multiple sources (off-deck or on-deck, all applications, including web, video, apps, messaging, etc.), across all devices and users. Alternatively, some gateway providers (e.g. Openwave) log data and provide some usage information. However, this tends to be dependent on the gateway vendor and also affects performance since it tends to be in-line. Traditional network analysis vendors (e.g. Radcom) capture network performance data such as packets consumed, protocols, etc. but not at the application level. Deep Packet Inspection (DPI) vendors (e.g. Sandvine, Allot) tend to capture similar protocols level data. Client-side vendors often insert code to capture activity from handsets. This tends to be dependent on the penetration of clients.

Analytics:

Traditional analytics vendors assume raw data to be available and the approach is to build custom queries on this data (e.g. SAS). The approach described in the preferred embodiment of this invention allows key aggregations to be built on this data, depending on the type of application, in order to offer fast access to a large number of analytics applications.

Use:

The preferred embodiment of the invention includes an approach where the data can be used across a number of applications in a scalable way.

According to the preferred embodiment of this invention, a Method and Apparatus is described that allows collection, analytics, and use of mobile usage information in real-time for multiple applications, while providing privacy controls on the collection, use, and access to data.

Solution Architecture

Figure 2:
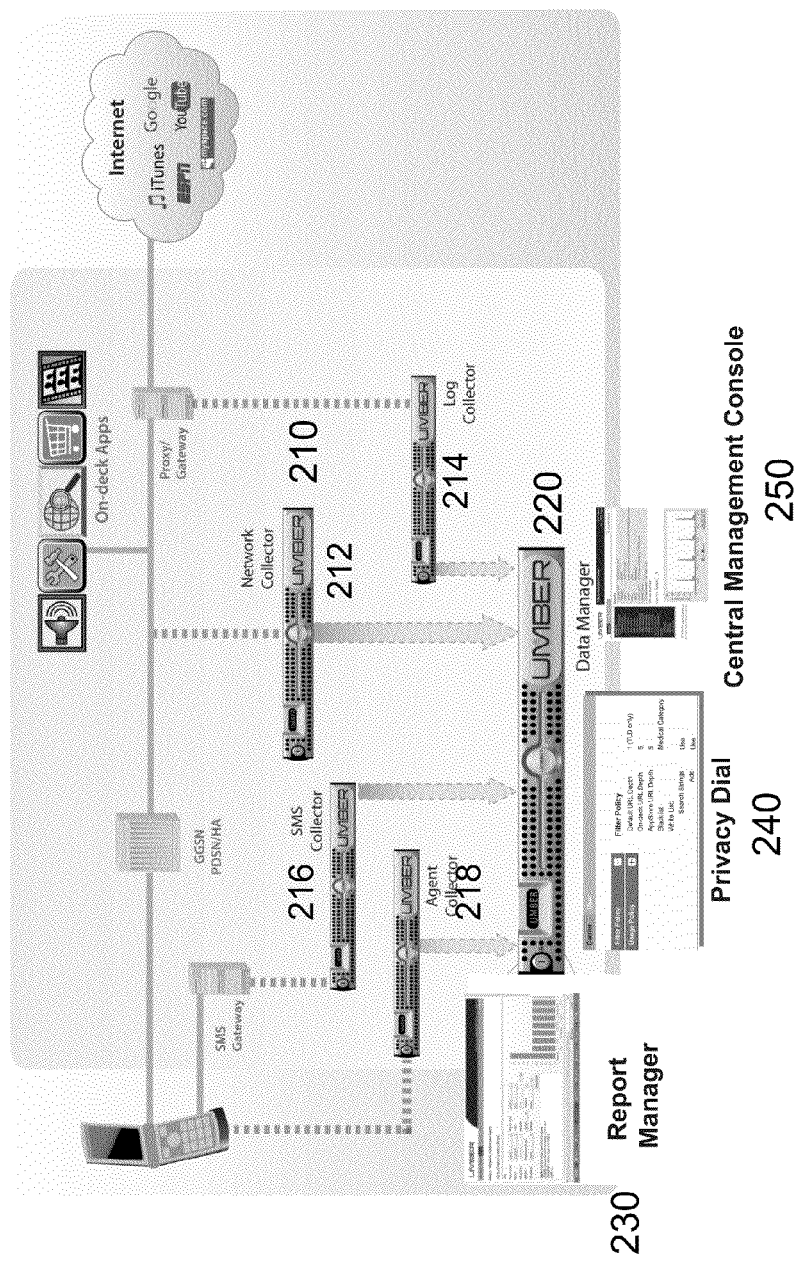
FIG. 2 shows the components of the preferred embodiment deployed in a typical carrier network.

As shown in FIG. 2, the preferred embodiment of the invention is deployed within the carrier network and offers a scalable, carrier-grade platform to generate analytics across all subscribers, devices, and applications. Specifically, the preferred embodiment of the invention includes the following functional components:

1. Collectors 210: These are appliances deployed in proximity to the data source to capture, reduce, correlate, and enrich incoming data in real-time.
2. Data Managers 220: These are appliances that support management and aggregation of the incoming events. It offers different types of aggregations that support the range of applications ranging from carrier marketing reports, third party aggregated data feeds, to user profiles for advertising. These Data Managers 220 can be deployed in a number of configurations as will be described later in the document.
3. Report Manager 230: The data processed by these elements is available for access via a web based application, Reports Manager 230. Various groups within the carrier may access different analytics applications from Reports Manager 230. Reports Manager 230 is the way for different users of the system to view reports.
4. Privacy Dial 240: This is a software based access control layer that enforces privacy settings on the capture, use, and access to data. Privacy Dial 240 allows carriers to configure, control, and audit how data is used in the system. As is suggested by the term, Privacy Dial 240 allows the carrier to change the granularity of data used over time as privacy regulations permit.
5. Centralized Management Console 250: This is a software layer that allows centralized management and configuration of all components in the deployed solution. This allows web, SNMP, and Command Line Interface (CLI) based control of the deployed systems.

Collectors 210 ingest data, perform lossless reduction, and correlate transactions to generate enriched events. Multiple Collector types are available, each suited to a different data feed. Carriers may deploy any combination of Collector types that best meet their business needs, and may deploy additional Collectors based on network usage and topography.

1. Network Collector 212: Network Collectors 212 process data captured via 10 GB network probes that directly monitor data network traffic. These Collectors are NOT inline devices, and do not introduce any latency or delay in traffic flow. These Collectors provide the richest data source.
2. Log Collector 214: Log Collectors 214 process the log files of various network/server nodes (e.g. the log files generated by a Packet Data Serving Node/Home Agent (PDSN/HA)). This type is also used when processing the output from DPI (Deep Packet Inspection) systems.
3. SMS Collector 216: SMS Collectors 216 process SMS data from the Carrier's network. The preferred embodiment of the invention provides its own Agent, and can integrate with third party agents.
4. Agent Collector 218: Agent Collectors 218 process data received data from software agents installed onto devices.

Collectors 210 capture and process HTTP traffic, video (streaming, download), app stores (downloads, usage), and other data applications (e.g. ftp, voip, etc.). For HTTP traffic, Collectors 210 only process the HTTP Headers, not the message payload.

Data Managers 220 perform analytics on the data. Depending on the carrier's needs, Data Managers 220 support both centralized and distributed architectures. These Data Managers' analytics drive specific applications, such as marketing, network planning, security, as well as advertising.

Report Manager 230 is the end-user application that provides the user interface to access the reports generated by the different applications. Report Manager 230 provides a large set of reports. Each report can be viewed across multiple time granularities (hourly, daily, weekly, monthly, and yearly), and can be toggled across different metrics (Page Views, Data Consumed, Response time, and Unique Visitors). Through its innovative UI paradigm, each report can also be further drilled down across multiple attributes as will be described later.

Privacy Dial 240 in the preferred embodiment of the invention provides a single access control layer that manages privacy settings across all components of the system. Specifically it controls filter policies on Collectors 210, usage policies on Data Managers 220, and access policies on the Reports Manager 230.

Dimensions and Attributes

Figure 3:
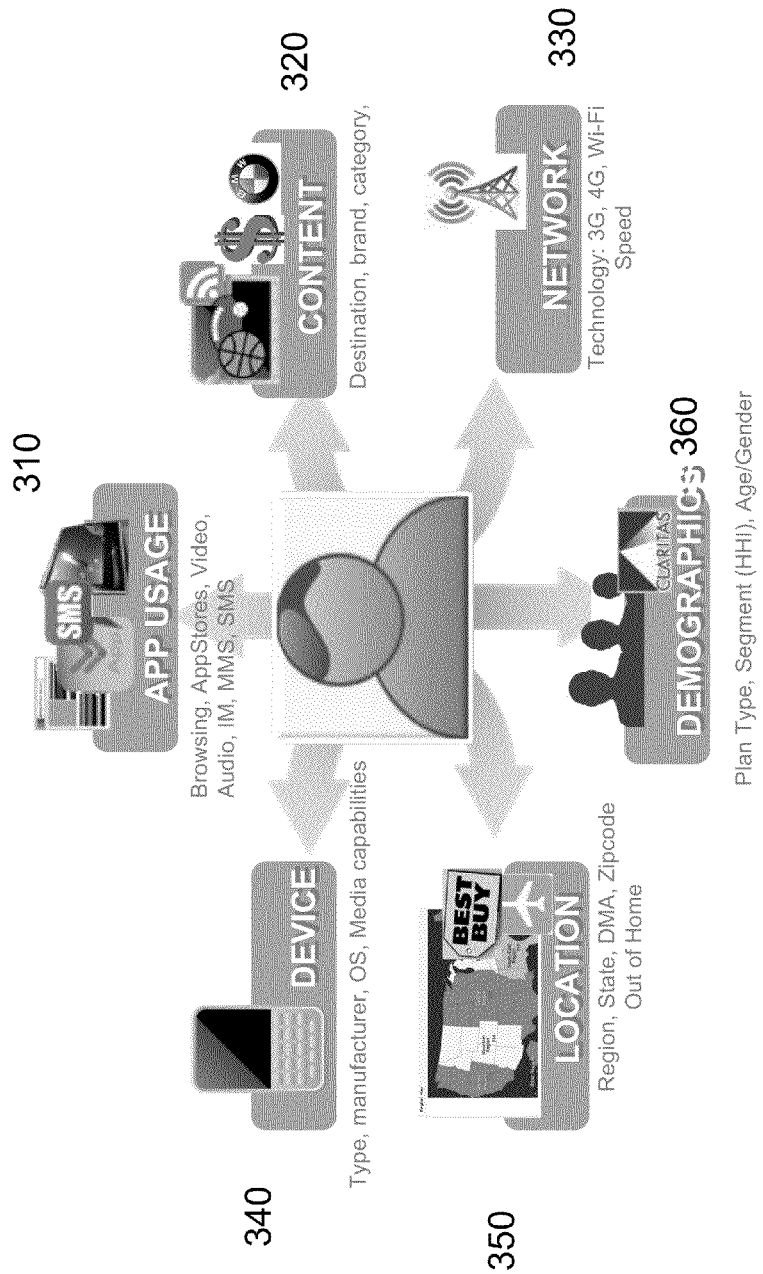
FIG. 3 shows an example of the data collected.

FIG. 3 shows more details on the different types of data dimensions and attributes that are managed by the preferred embodiment of the invention.

1. Application 310: Web, video, audio, messaging, and app stores are all processed by the preferred embodiment. Specifically, within each application, the preferred embodiment provides insight across multiple attributes such as protocol types (e.g. HTTP vs WAP for browsing, or HTTP vs RTSP for streaming). Within app stores, the preferred embodiment can provide analytics on downloads and usage activity of thousands of applications from a number of popular app stores including Android, Apple, RIM, etc.
2. Content Provider and Type 320: For any application, the preferred embodiment captures the provider of the application. Specifically, the Brand and Category of the content is captured. Further, the preferred embodiment can also provide analytics on advertisement impressions and clicks delivered from many key ad networks, including Admob, iAd, Millennial Media, etc.

3. Device 340: For every transaction, the appropriate device type is captured.

Each device is characterized by multiple attributes such as type (smartphone, PC, tablet, featurephone), model, manufacturer, etc. In addition, media capabilities and operating system and browser are also captured. The preferred embodiment can use a combination of International Mobile Element ID/Mobile Equipment Identifier (IMEI/MEID) and User Agents (UAs) to derive the most precise information. The preferred embodiment includes a database that has hundreds of devices that have been pre-categorized, and allows for efficiently updating the database as carriers continue to deploy innovative, new handsets.

4. Location 350: The preferred embodiment can provide multiple levels of location data, depending on what the carrier chooses to make available. This ranges from cell sector through city (e.g. Direct Marketing Area (DMA)), to state and region. Specific regions can be configured based on a carrier's preferred geographic view. The preferred embodiment can capture location data from RADIUS feeds. In addition, it can optionally integrate with a carrier's Location Based Services (LBS) platform for additional location data.

5. Network 340: The preferred embodiment can report across multiple network speeds and types.

6. Demographics 360: The preferred embodiment has the ability to capture and report on multiple demographics aspects, including age and gender, Household Income (HHI), segment, etc. This information can be obtained by integrating with a carrier's data source through flexible APIs. In addition, it can also infer certain patterns such as age and gender. The preferred embodiment can also work with off-line data providers to combine off-line activity with on-line usage. The preferred embodiment allows analytics across pre-defined as well as custom segments.

Figure 4:
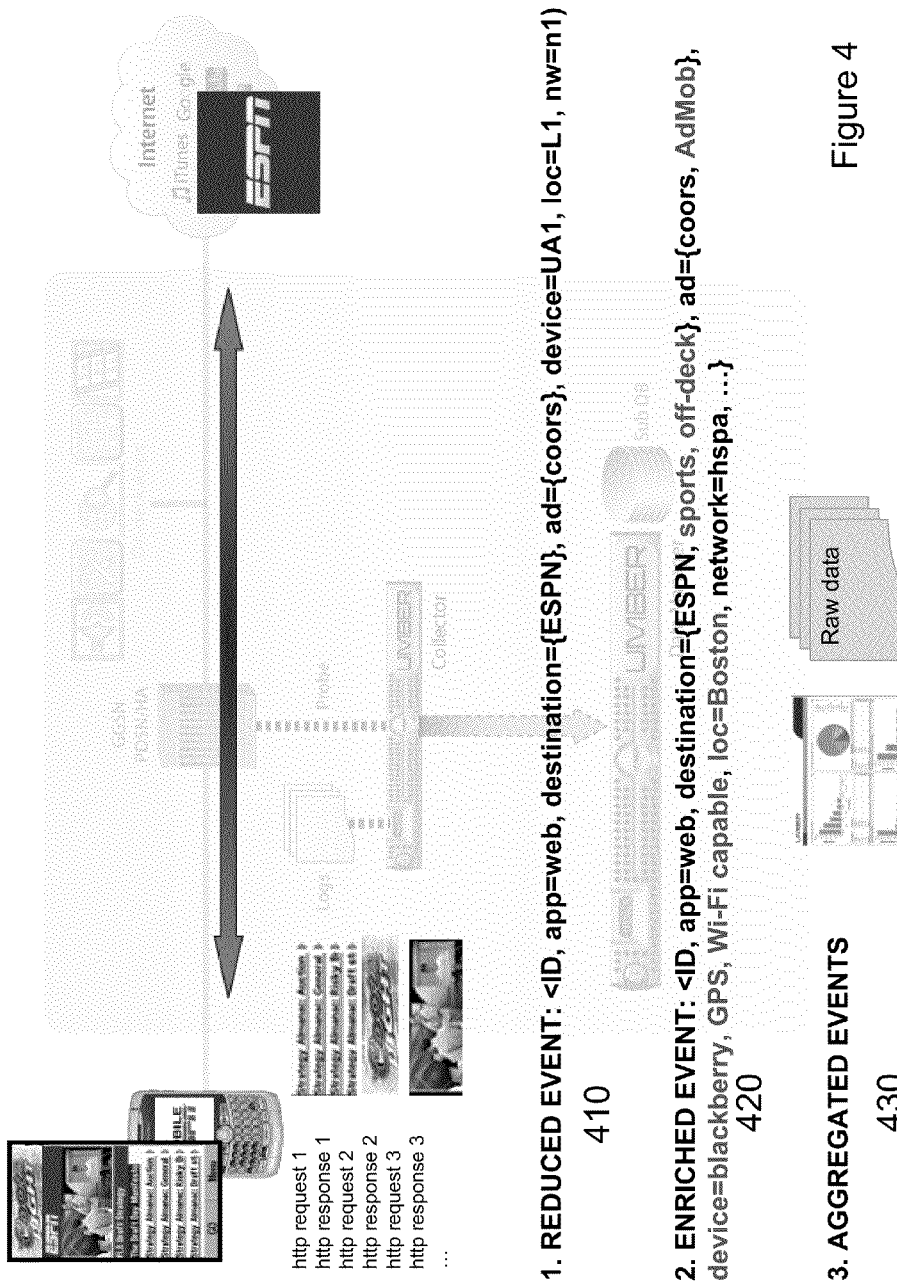
FIG. 4 shows the overall operational flow.

FIG. 4 shows an example of how raw data is collected, aggregated, and processed by the preferred embodiment. Raw transactions are combined to form 'events' 410. Every 'event' is characterized by multiple dimensions and attributes described above. This allows very flexible analytics across all these dimensions.

In brief, the preferred embodiment performs 3 steps on the available usage data.

1. Collect and reduce Transactions to generate Events 410
2. Enrich events to generate Enriched Events 420
3. Aggregate events for multiple applications to generate Aggregate Events 430

Capture Events:

User activity on the network creates raw transactions that are captured. For example, a user accessing cnn.com generates multiple network transactions, each fetching a piece (e.g. text, multimedia, advertisements, etc. . . . ) of the final page. The preferred embodiment correlates these discrete network-level transactions into a single event that retains the relevant data from the component transactions. Additionally, the application drops transaction details that are not relevant to the analysis. (e.g. Cascaded Stylesheets (CSS), image contents, etc. . . . ).

Enhance Event:

After fully defining the event 410, the application then enhances the event 410, using the categorizations stored in its database. For instance, destination content is enriched with the brand or category (e.g. destination foxsports.com is tagged as "sports" while a visit to facebook.com is tagged as "social networking"). App store events are characterized as downloads or usage. Ad events are characterized as being an impression or click and the network that delivered it. Location details are enriched by mapping network location IDs to actual location. Devices are mapped to types, and other attributes such as model, manufacturer, and media capabilities are mapped. The end result is enriched event 420.

Aggregation:

The preferred embodiment aggregates these enriched events 420 across different dimensions, creating insightful analytics and powerful user profiles. The end result is aggregated event 430.

Figure 5:
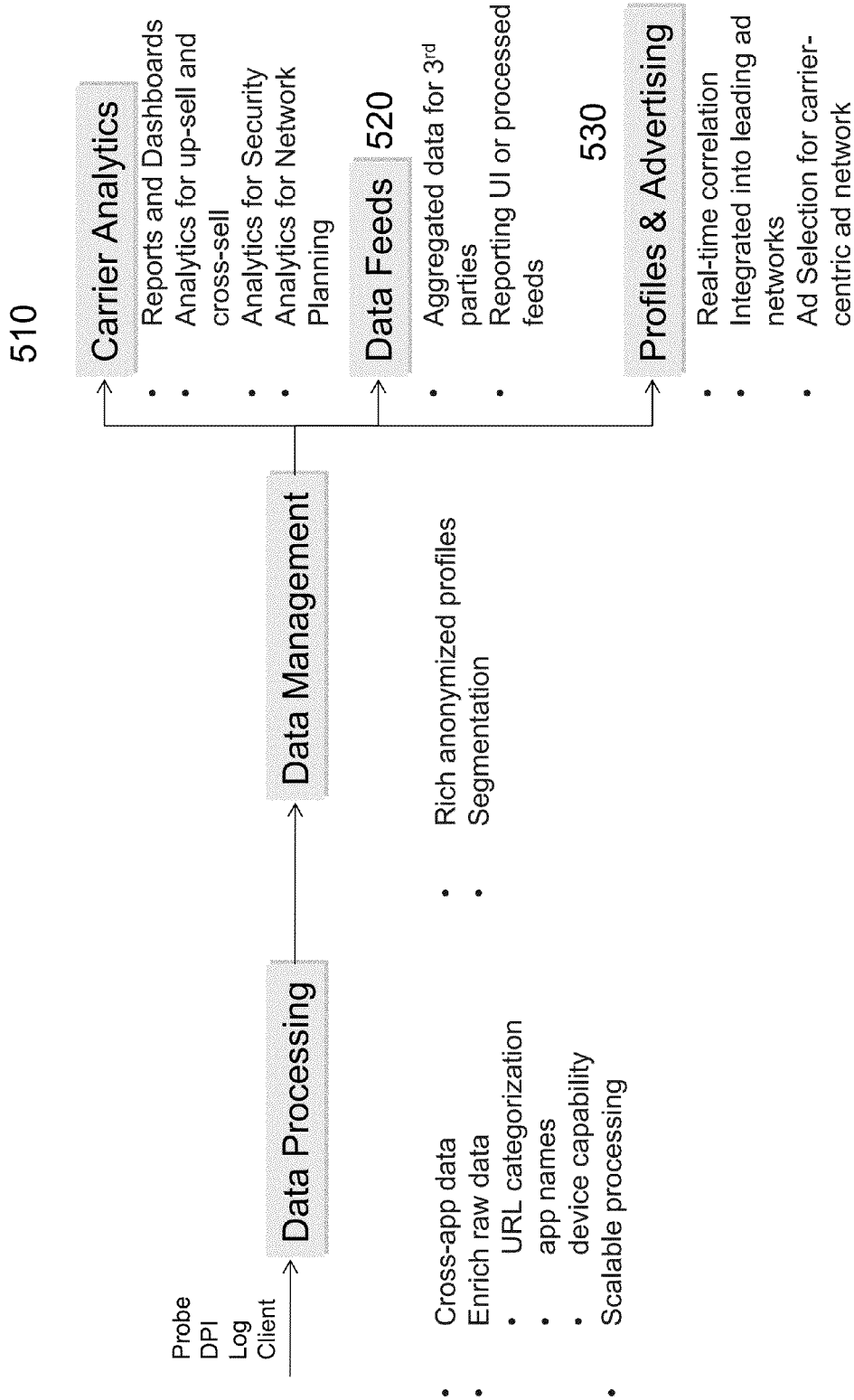
FIG. 5 shows how the data feeds into multiple analytics applications.

FIG. 5 shows how components of the preferred embodiment produce multiple analytics solutions from a single data feed. Functionally, the Collectors handle the input processing and enrichment. Depending on the deployed Collector type(s) (e.g. Network or Log) and the available data, the amount of aggregation and correlation required from the preferred embodiment varies. However, the enrichment process applies in all scenarios.

As shown FIG. 5, the collected data can supply information to multiple data-based solutions such as internal analytics and third party measurement solutions as well as offerings that depend on user profiles, such as advertising and promotions. In addition to the specific analytics, these three solutions are differentiated based on the data used and appropriate privacy controls.

At a high level, the preferred embodiment provides three classes of analytics solutions. These solutions fall into three main groups:

1. Carrier Analytics 510: This refers to solutions used by carriers for their internal needs such as marketing, security, network planning, etc. In this case, an embodiment applies required privacy controls and feeds appropriate data into the applications. The right level of reports is exposed based on roles and privileges.
2. Data Feeds 520: This refers to solutions where processed data is fed into third party vendors such as measurement providers for additional reports. In this case, an embodiment of the invention allows the right level of "processed" feeds to be fed into these providers. Each provider may have a different set of data depending on their needs and business policies.
3. Profiles and Advertising 530: This refers to solutions that are based on deriving user-level anonymous profiles. These profiles can be used on demand in a number of applications, ranging from targeted advertising, to internal up-sell and cross-sell applications. Further, targeted advertising ranges from the carrier's own ad network to providing campaign selection to transaction-level profile feeds to third party ad networks.

The three types of solutions based on the preferred embodiment are described in some detail next.

Carrier Analytics

Figure 6:
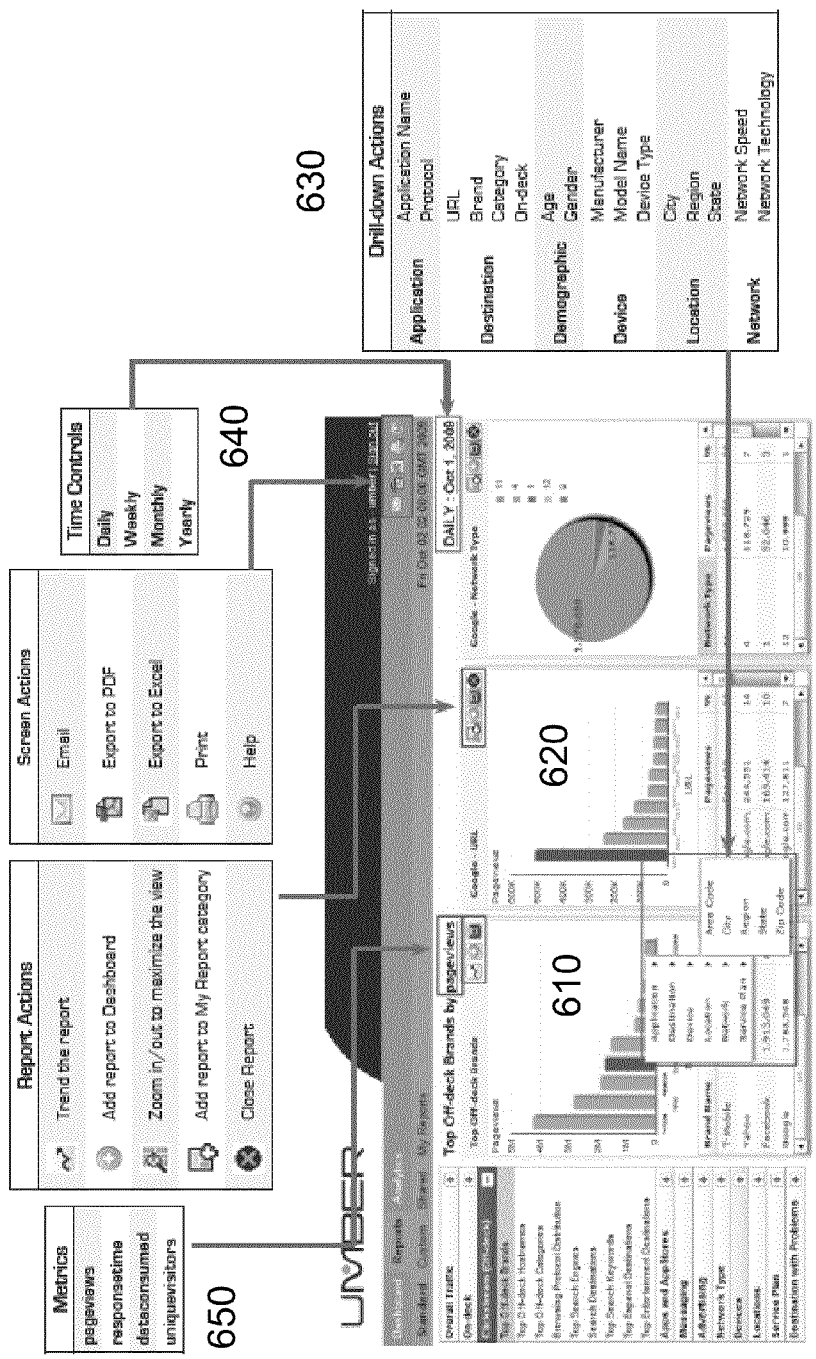
FIG. 6 shows an example of the user interface for the Carrier Analytics solution.

The preferred embodiment can come with numerous high-level pre-defined reports, each of which can be viewed across multiple metrics and multiple time granularities. Each report can also be drilled down across multiple dimensions and attributes. As a result, the preferred embodiments can provide over 10,000 internal reports that are all available with a single click. FIG. 6 shows a sample screenshot of the UI in the preferred embodiment.

Reports can be viewed graphically 610 or in tables. Any report can be viewed across multiple time granularities 640, ranging from daily to yearly. If the carrier has deployed Network Collectors, then the application supports hourly and near real-time reports. Any report can also be viewed across different metrics 650, including pageviews, video views, messages, downloads, etc. Further, any report can be drilled down 630 into more details. For example, as shown in the figure, the first report may be around top brands. A specific selected brand may then be analyzed further 620 to look at say the URLs within that brand or device types, etc. This flexible drilldown provides the ability to run analytics on any report without having to build custom queries.

Figure 7:
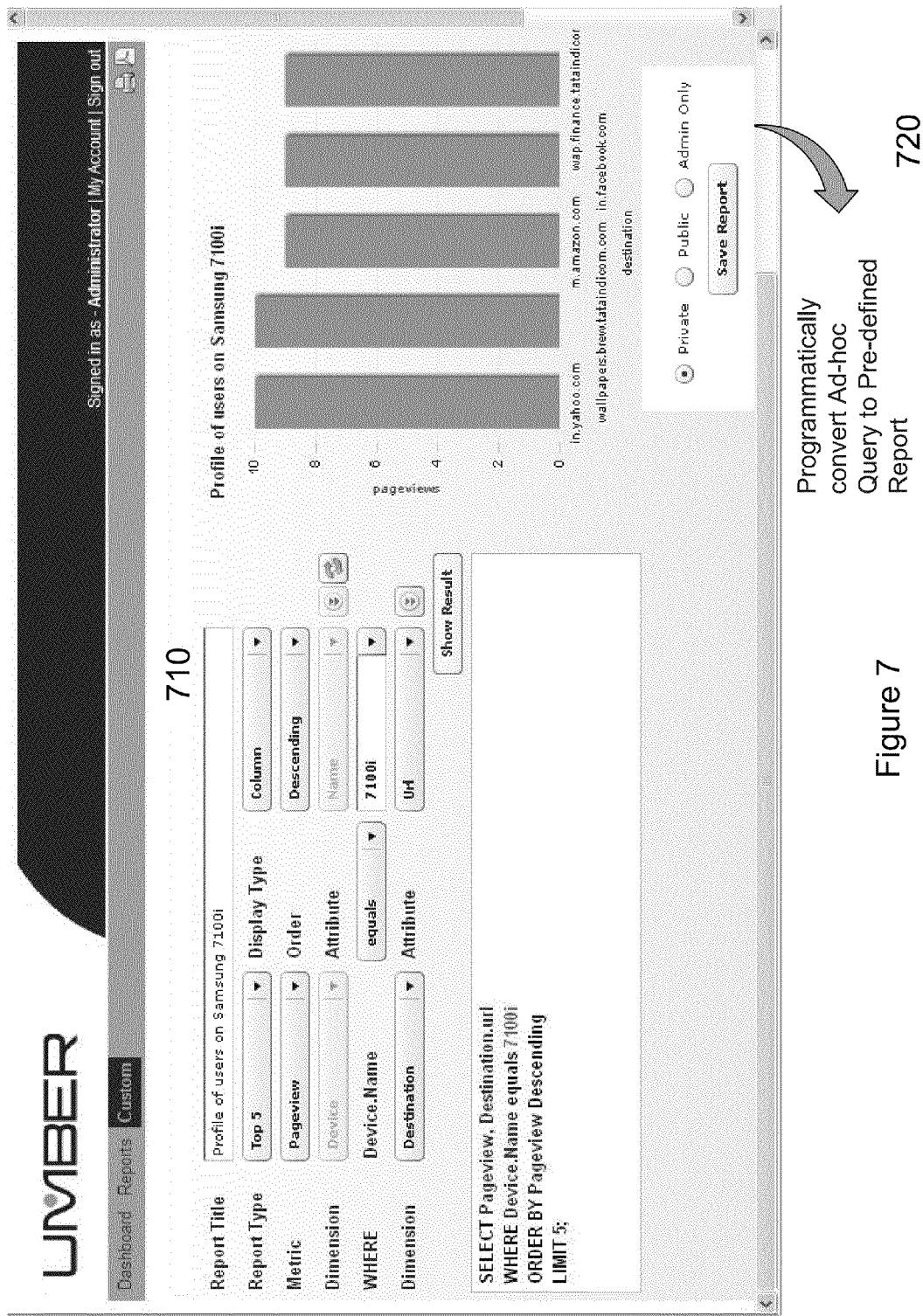
FIG. 7 shows an example of the user interface for generating custom analytics.

For example, consider a top level report around Top Destination Brands. Within this report, one can select CNN. Then, it is possible to Drill down by several attributes, such as:

Destination→Category
Application→Group, Application→Name
Device→Type, Device→Manufacturer, Device→Model
Location→City, Location→State, Location→Region
Network→Type, Network→Speed
Demographics→Age, Demographics→Gender In addition to these pre-defined reports, the preferred embodiment also allows programmatic creation of ad-hoc reports. Through a simple UI as shown in FIG. 7, a user may create their own reports 710. This simple UI shown in FIG. 7 provides the ability for a non-technical person to run queries within an English language like framework. Users may save their ad-hoc reports 720 for later re-use.

The reports can be further grouped to reflect the needs of multiple stake holders, including security, marketing, and network planning For instance, network planning groups will typically be more interested in the data consumed metric. Specific groups of reports around data usage, location, traffic by network type, etc. are made available to this group.

Marketing groups may use this data for aggregated reports on usage and behavior patterns. In addition, they may also develop specific reports by segment to create specific offers. For instance, they can identify a group of users that downloaded a specific app and then find out interests of this group. Then if the carrier wants to market a new product to the same group, they would know where to advertise that product to get maximum exposure. This is based on aggregated data. In the profile based solution, it is possible to get lists of specific users to create specific promotions.

Due to its ability to capture data in real-time via Network Collectors, the preferred embodiment also enables more real-time reports that address the needs of security groups, such as monitoring spikes to certain URLs or detecting anomalous usage from specific users.

Data Feed Solutions

The preferred embodiment allows carriers to provide processed feeds into third party measurement players with the right level or privacy. This allows a new data monetization revenue stream.

This can be done in two ways.

Figure 8:
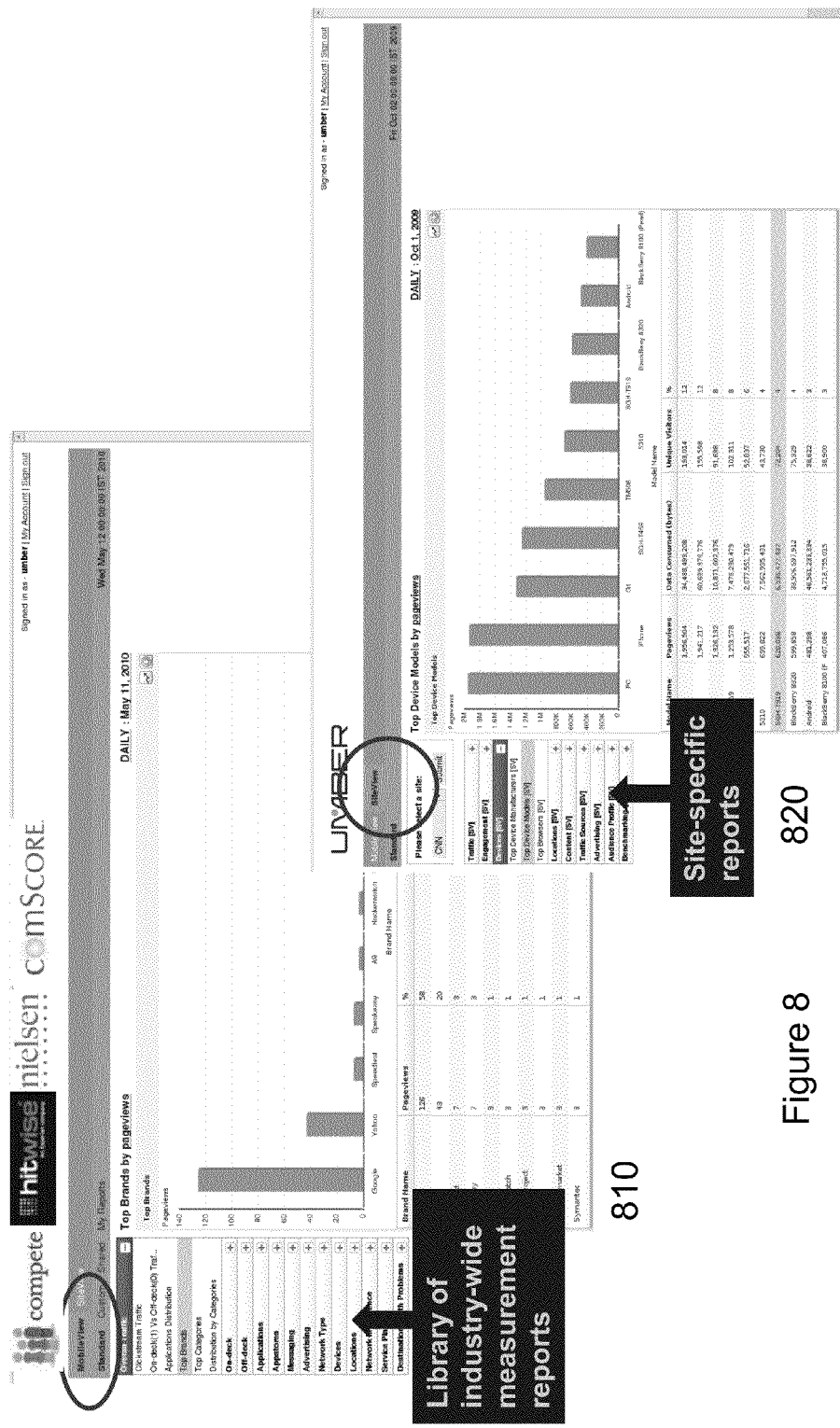
FIG. 8 shows an example of the user interface for a measurement application.

1. UI: FIG. 8 shows a sample UI of the types of reports enabled by the platform. This includes industry-level view 810 that captures analytics across all dimensions and site-specific reports 820 that provide in-depth analysis for a specific site. This is similar to the data captured for carrier's solution with the added normalization of the data. The normalization process assures that the collected data is projected to remove a carrier's bias and is projected across the national population. One approach to do this is to leverage existing segmentation schemes such as Nielsen Claritas to find the proportionate weighting of segments within a carrier and compare against the national average. The data can then be appropriately normalized based on this proportion.

Figure 9:
FIG. 9 illustrates transfer of processed feeds for a measurement application.

2. Processed feeds: The preferred embodiment allows multiple, possible different, feeds to be provided to different vendors. The processed feed allows data to be exported as a feed instead of being accessed through a UI. As an example, if the desired report is around top URLs, the preferred embodiment provides just the relevant information as shown in FIG. 9. As shown, only an extract of the relevant report data is pulled from the system 910. This allows the carrier to control the data being shared from both a privacy and business relation perspective—they don't have to offer all the data to every vendor.

Profiling and Advertising

The preferred embodiment allows carriers to generate new revenue both by providing ad networks with targeting information and by enabling the carrier to better target its own up-sell/cross-sell efforts to the customers. And it enables all this in a "privacy-safe" framework that protects the user's personally identifiable details.

Figure 10:
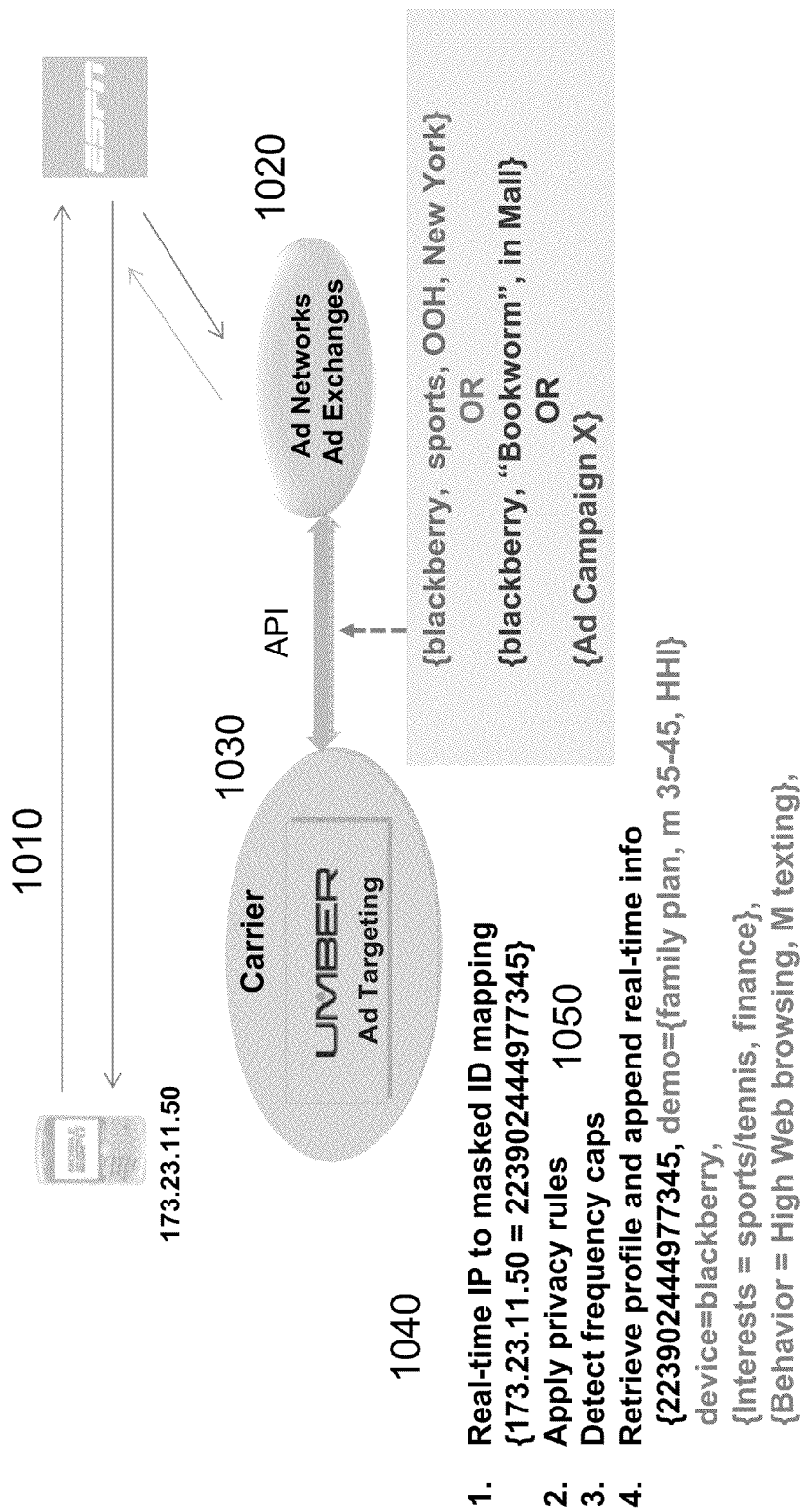
FIG. 10 shows how profiles can be shared with ad networks.

To understand the concept of the targeting solution, let's first understand how ad networks typically serve ads to mobile devices. As shown in FIG. 10, when a device requests a page 1010, the site calls an ad network to select an ad 1020, which is delivered to the user. With targeting enabled, the ad network/exchange now queries the preferred embodiment within the carrier network 1030 to get additional information about the impression being served. The preferred embodiment maintains a mapping of the current IP to the user's internal masked profile to collect appropriate parameters 1040. This information is then passed through the privacy controls 1050 and is shared in real-time in a non-persistent way. A few possible ways this could work:

1. The information shared with the ad network reveals the interests of the user (e.g. sports), allowing the ad network to select an ad for an upcoming sporting event.
2. The information shared with the ad network maps the user to a known market segment and location type, which the ad network uses to select a relevant ad.
3. In a third instance, the solution indicates to the ad network that the user is a candidate for the "Crunch More Doritos" advertising campaign.

Note that while the example described real-time ad exchange, the same solution can also be used to drive internal promotions from the carrier.

Figure 11:
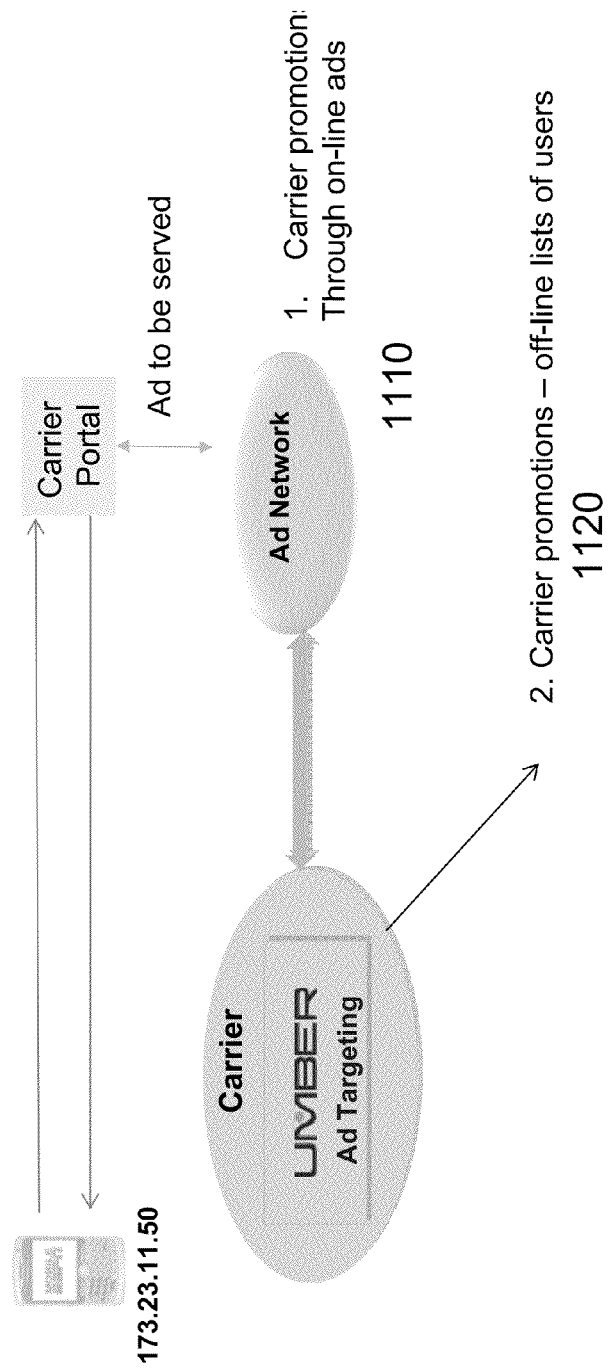
FIG. 11 show how profiles can be used for carrier promotion.

FIG. 11 illustrates how a carrier could use the Advertising and Profile functionality for internal up-selling and cross-selling purposes.

1. When a user visits the carrier's on-deck portal, house ads related to relevant promotions and offers can be presented to the user 1110.
2. Specific lists of users relevant to promotions can be derived for other off-line promotions 1120.

The FIG. 12 shows how the usage collected can be used to generate user level profiles.

When building a profile, the application generates enriched events, as described previously. These events are then aggregated at a user level to build cumulative activity and behaviors. While conceptually the same as the aggregations used for Carrier Analytics and Data Feeds, the specific aggregation logic is distinct. As shown in the figure, the aggregations 1210 are built at a user level.

Figure 13:
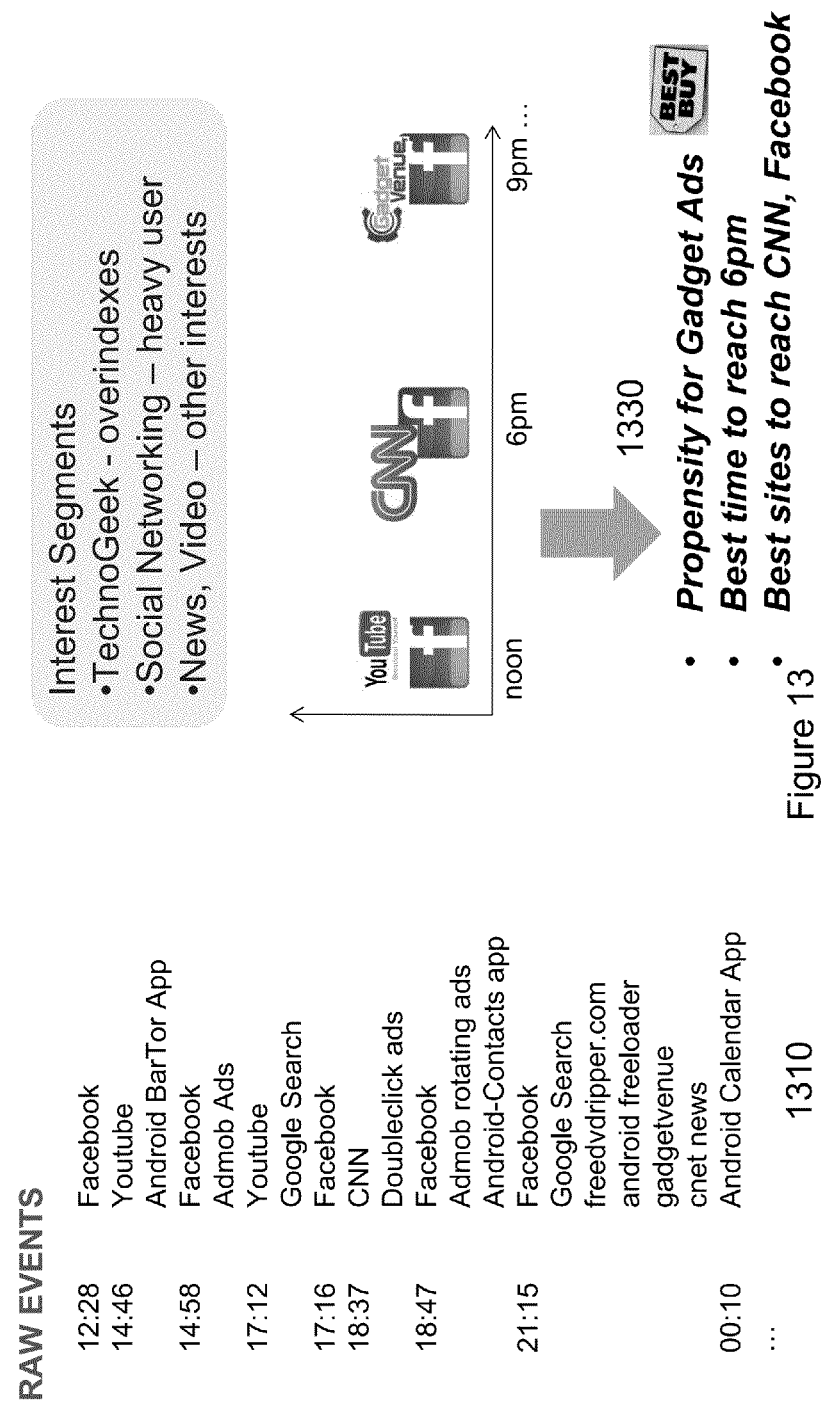
FIG. 13 shows an example of a profile generated for user level activity.

FIG. 13 shows an example profile built out of an example user's traffic. Events related to specific activities are captured on the left 1310. These are then analyzed to map the user into interest segments 1320 by computing their affinity and relative behavior. Daypart behavior can also be extracted. Based on this, the application generates a profile 1330 that helps advertisers determine the type of ad, the time of day, and appropriate sites it can be displayed on for maximum effectiveness.

Figure 14:
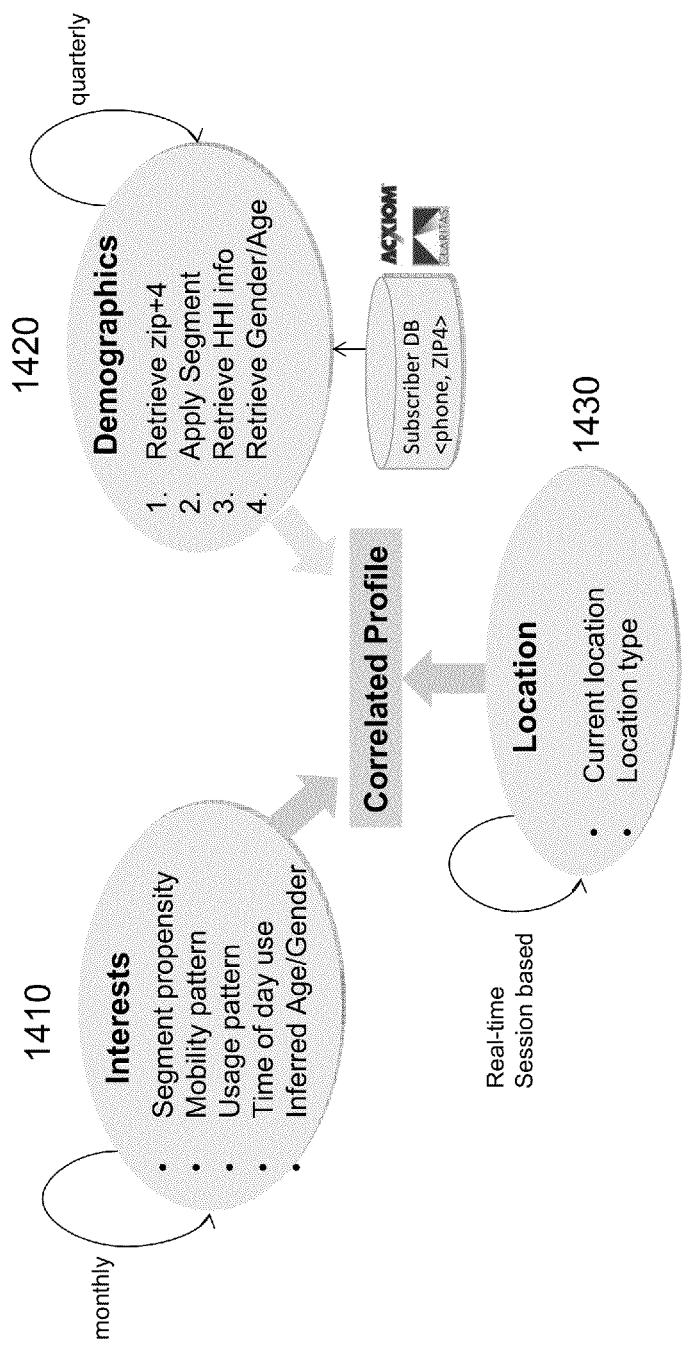
FIG. 14 shows how multiple aspects of a profile can be correlated.

Note that these profile elements are managed continuously and correlated on demand to determine the most appropriate profile. As shown in FIG. 14, the aggregations involve behavior and Interests 1410, which might be updated either weekly or monthly. Demographics feeds from carrier or third party systems may be added at a smaller frequency 1420. Lastly, real-time location level data may also be appended 1430. The preferred embodiment allows for continuously building the profiles and tying them together in real-time.

Figure 15:
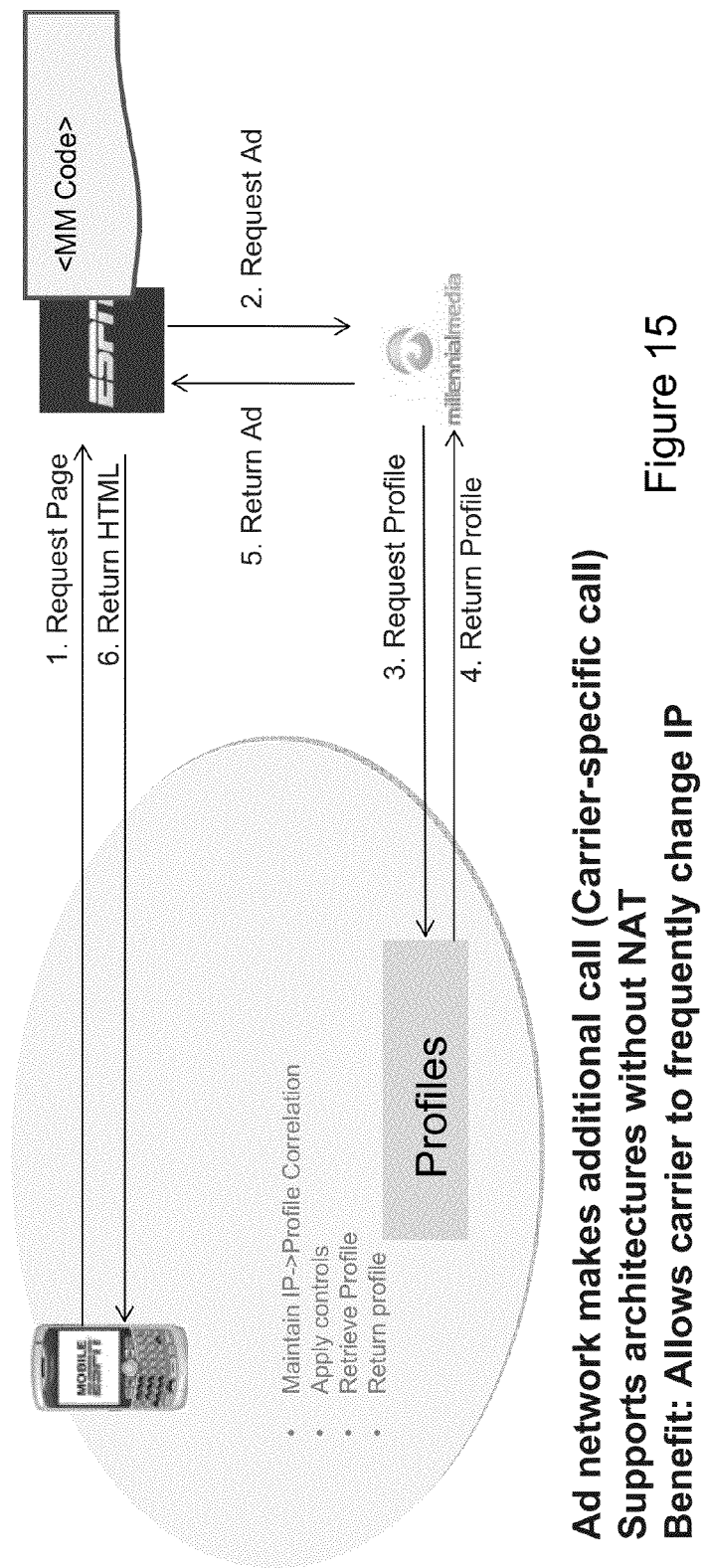
FIG. 15 illustrates sharing profile information through server side calls.
Figure 16:
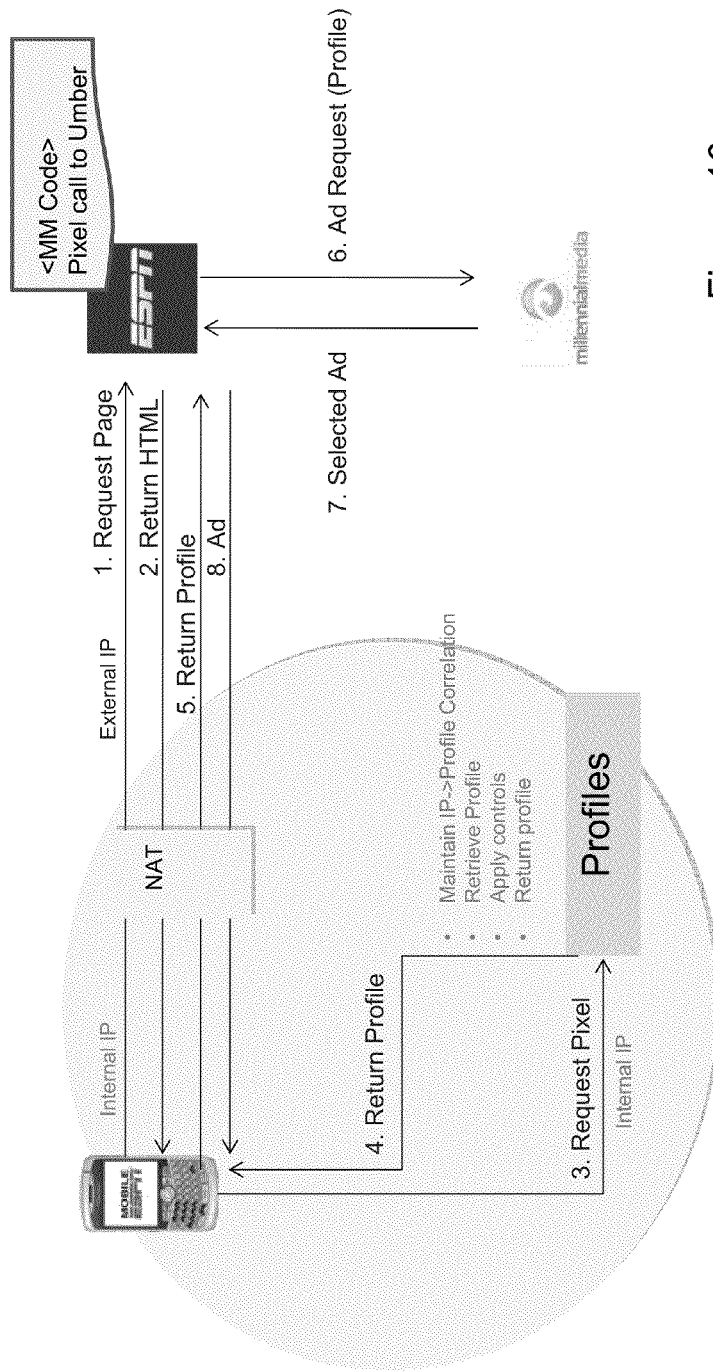
FIG. 16 illustrates sharing profiles information through client side calls.

FIGS. 15 and 16 show how the profile can be shared in real-time with multiple ad networks.

Privacy Controls

When working with consumer data, privacy is one of the key issues governing how data is collected and used. Organizations, industry groups, and governments are all working to create policies to safeguard consumer data while acknowledging that information derived from this data will help drive businesses. Protecting personally identifiable information (PII) while still meeting business needs is a key point for any analytic system that uses consumer data. The Privacy Dial in the preferred embodiment ensures that useful information can be collected and analyzed without compromising the personal information of the consumers whose transactions generate the data.

Privacy controls can and should be implemented at many points in the process from collection to analysis. What, how, and who are the three dimensions of data control. The Privacy Dial in the preferred embodiment enables filters to control what data moves through the system, usage controls to affect how the data is analyzed, and lastly access controls to limit who can see the data. This three-pronged approach enables the preferred embodiment to meet the demands of the most stringent privacy policies while still providing useful information to data analysts.

Figure 17:
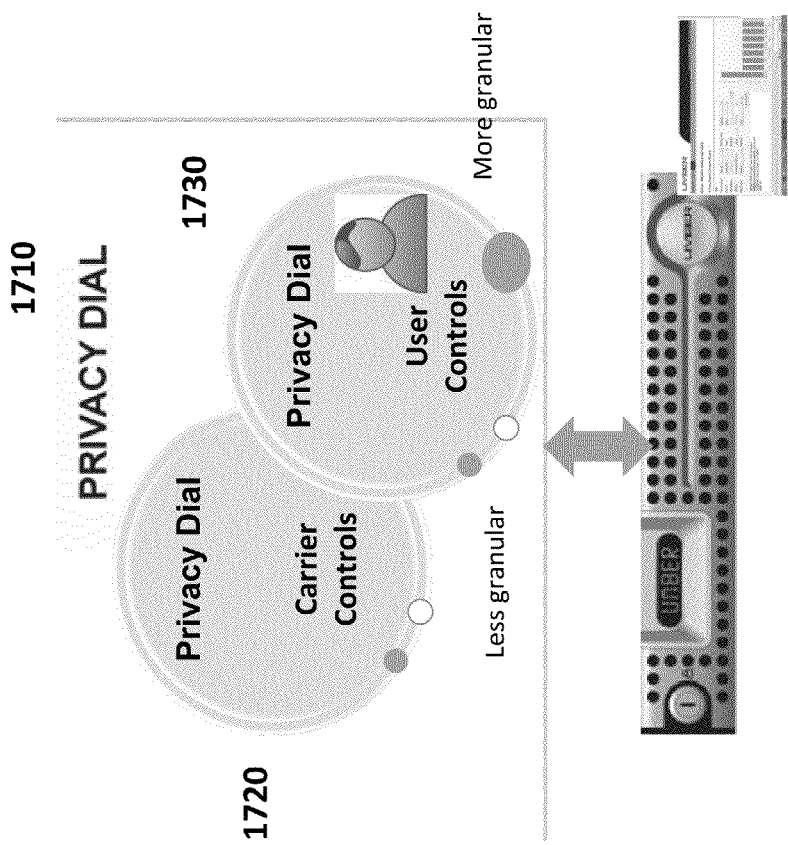
FIG. 17 shows an example of the Privacy Dial.

The preferred embodiment is built from the ground up based on privacy controls. Specifically, Privacy Dial 1710 in the preferred embodiment shown in FIG. 17 offers capture, usage, and reporting controls that give the carrier control of data collection and access in order to support constantly evolving privacy regulations. The concept of the Privacy Dial is meant to allow carriers 1720 to change control over the settings, knowing that in early days, the dial may be less granular, while over time as privacy regulations evolve, the controls can be made granular. The Privacy Dial is unique in the way it exposes the controls that can be used by any business user, while still being tightly integrated into the platform implementation. This ensures that any "Privacy Officer" can set the dial and audit information collection and usage. In addition, users can individually control what aspect of their data is used for which application. This allows user-level Privacy Dial 1730.

FIG. 18 shows some details on the Carrier Privacy Dial settings. This allows three key controls:

1. Capture Filters 1810: These define what data is captured in the first place. Note that since different applications may need different data, it is important to not lose any information in the capture process.
2. Usage controls 1820: Since different applications may use data in different ways, the Privacy Dial lets a carrier control how data is used for different applications.
3. Access controls 1830: This defines who gets access to what data, depending on roles and privileges.

Capture Filters

The preferred embodiment includes Capture filters 1810 that allow a carrier to specify controls 1818 on what data is captured. These policies are enforced in the Collectors of the preferred embodiment. This is mainly to allow the carrier to have controls on data collection per their privacy policy. Note that these filters can be enforced in both log and probe mode of the preferred embodiment. Some example controls are described below. Note: This should not be construed as a complete list.

1. URL default depth 1811: this specifies the default depth to which URLs may be captured. For instance, a default setting may be the top-level domain (TLD) only. Additional rules below define exceptions to the default rule. Over time this depth can be increased based on carrier needs.
2. On-deck URL depth 1812: Since the carrier might have additional needs to better understand on-deck traffic, it is possible to provide a generic rule to allow on-deck URLs to be captured to a deeper level. The preferred embodiment's categorization flow allows mapping of URLs as on-deck or off-deck. The preferred embodiment can also include a carrier's existing on-deck catalog for this mapping.
3. App store activity 1813: App store download activity needs URLs to be analyzed beyond the TLD. When capture App stores is enabled, the platform enforces the collection so that all "App store" specific URLs automatically get processed with this policy. The preferred embodiment has the intelligence to define what constitutes App stores—it is not necessary for any administrator to have to define these details. As new app stores and related patterns evolve, the underlying platform automatically enforces these—the carrier does not need to manually define these rules. The continuous dimension management process detects, categorizes, and distributes these patterns through the system.
4. Black list 1814: Some content types or URLs can be blacklisted, which prevents them from being stored in any form in the system. Examples could be general images or specific content categories (e.g. medical sites). The preferred embodiment has the intelligence to know what content is in what categories—there is no need for any administrator to define specific URLs. Additionally, there is usually content such as jpegs and CSS stylesheets etc. that doesn't add anything meaningful to the analytics. These can also be filtered out of the collection process by blacklisting these patterns. This reduces the volume of data stored/transported. In typical deployments, removing these types of content can lead to a 50-60% reduction in raw transaction capture. Note however, that the preferred embodiment does this intelligently, while retaining images related to ads, as is described in whitelists below.
5. White list 1815: this allows a way to override exceptions to other rules to allow the capture of items such as query parameters or search strings or specific URLs to a different depth. Note that analysis of search or ads inherently requires additional information to be captured beyond the TLD (Top Level Domain). The white list rules have knowledge of different search engines and ad networks and their inherent formats, thereby allowing capture of this information. Specifically this filter rule allows a carrier to select which applications are of interest and so that data can be captured per the selection. The interpretation of the rule and the relevant content is done by the preferred embodiment—there is no need for a carrier to define and continuously maintain mapping of URLs into specific application categories.

a. Selective URL depth: It is possible that some URLs may be captured at a different depth than others. For instance, in general all URLs are captured at the default depth, while some URLs for top brands might be interesting at a deeper level (e.g. cnn/finance, cnn/sports, cnn/entertainment, etc.). It is possible to define additional depth for these URLs or brands in this filter. These depths can be turned on and off—so a specific URL may be captured for a certain duration or event (e.g. monitor a cnn/sports/fifa url during the world-cup).
   b. Ad networks: Since ads are images, it is important to identify these ad related patterns and retain these images, while dropping other images as described in the blacklist rules above. The preferred embodiment includes signatures for multiple ad networks that can be captured. Further, it can distinguish a click from an impression. When a filter rule about capture Ads is specified, the preferred embodiment will automatically enforce the collection of ad network related URLs to the right depth. As ad networks evolve, these rules are kept up to date.
   c. Search strings: When 'search capture' is enabled, the preferred embodiment captures query strings for all the search related content. As with other rules, there is no need for the carrier to define search engines. Embedded in the search capture are rules that define different search engines and their patterns and these are continuously maintained through the dimension management process.
   d. Referrers: Other patterns that can be added over time include capture of referrers. Referrers provide interesting information on how content flows. However, they add to the size of data captured. So there might be a need to balance functionality with performance. For instance, a marketing person might specify that refers should be captured. However, from the IT perspective, this could impact storage. So it could be that for efficiency, referrers are selectively captured for ad related URLs only. Such selective controls can also be provided through this filter control.

FIG. 18 shows the types of filter controls and how this can influence the actual data captured by the Collectors. The Management Console in the preferred embodiment allows these rules to be specified centrally and applied across multiple distributed collectors. In the event that the capture process (e.g., with third party DPI vendors) captures the entire event, these filter rules can also be applied centrally before the data is used.

FIG. 19 shows examples of types of URLs that would be seen on the 'wire' at the input of the capture process and the relevant output URLs that would be used from the collection process, based on the filter rules applied.

1. At 1910, only facebook.com is captured because the Default URL depth is set to 1—TLD only.
   2. At 1920, only weather.com is captured because the Default URL depth is set to 1 AND Location is in the Blacklist.
   3. At 1930, the whole URL is captured because it is an On-deck URL and On-deck URL depth is set to 5 and it is 5 levels deep or less.
   4. At 1940, the whole URL is captured because it is an App store URL
   5. At 1950, the whole URL is captured because Search strings are White listed so they are always captured.
   6. At 1960, the whole URL is captured because it is an ad.

In addition to the Capture Filters, the preferred embodiment allows different Usage Controls to be imposed, depending on the application being run in the Data Manager. For instance, a carrier's network team may have access to all the data, while marketing may be restricted to a subset of reports. Further, external third party measurement vendors may receive only some data. FIGS. 20*a-d* shows how the usage control can apply across different applications in different Data Managers. Note that usage rules are also enforced from the central collection point.

As shown in FIGS. 20*a-d*, Usage controls determine how the captured data is used by different applications in the Data Managers, depending on the privacy controls. This ensures that while all the required data is captured, some applications might enforce different policies on what part of the data is used for which application. Specifically, carrier network teams are often allowed to look at reports based on all data. As shown in FIG. 20*a*, for the carrier network team analytics 2010, it is ok to use data regardless of whether users opt-in 2011 or not 2012, whether they look at carrier's on-deck content 2014 or off-deck content 2015, as well as location data 2013. The UI shows an example of how such controls can be updated from the UI. This approach ensures that all the relevant data can be captured once but used in different ways depending on privacy needs. As shown in FIG. 20*b*, for the carrier's portal team analytics 2020, only opt-in users data 2011 is used, and when they are browsing to on-deck sites 2014. As shown in FIG. 20*c*, for Measurement applications 2030, data from opt-in users 2011, location data 2013, and data for both on-deck 2014 and off-deck 2015 usage is permitted. FIG. 20*d* shows how Ad network applications 2040 can also control what sections of data are used to build user profiles. Specifically, opt-in users 2011 are allowed. Further, 2043-2047 show examples of analytics that can be calculated on these users. An advantage of allowing separation of capture, usage, and access controls is that the carrier and user have full control on how data is captured and used without having to have separate collection implementations. In addition, different applications of the data can use the collected information in different ways. Providing a UI control allows these to be changed easily.

Usage control policies also allow a carrier to manage opt-out controls.

Specifically, if a user has opted out of an application, it is important that this user's data is not used for that application. However, from a network design perspective, it would be important that this information is still available to the networking team.

Figure 21:
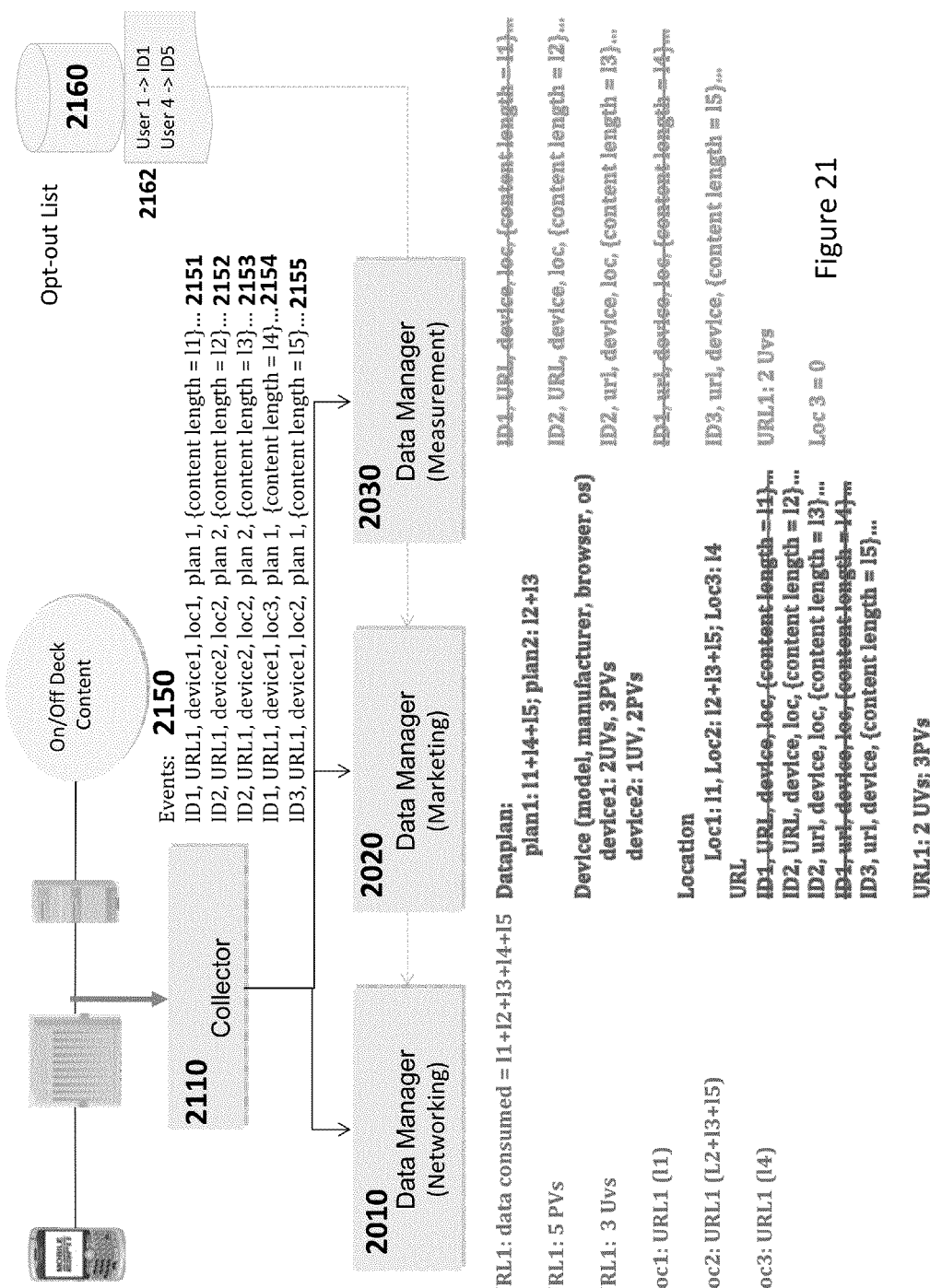
FIG. 21 shows how opt-out can be managed.

Usage control policies in the preferred embodiment define how data is used within applications. Specifically, once data is collected, different applications in various Data Managers may aggregate it in different ways. FIG. 21 shows this in some detail for 3 exemplary use cases. The enriched events coming out of collector 2110 are shown in 2150 as specific events 2151-2155. This includes 3 specific users, 1 url, and couple of devices. This shows the output after any filter controls are applied for specific applications carrier networking 2010, carrier marketing 2020, and third party measurement 2030. The opt-ins are managed through an opt-in server 2160. Suppose that User 1 and 4 have opted out of the measurement application and marketing application as shown in 2162. The opt-out control database will make available the phone numbers or some masked IDs around these users so that the Data Manager knows which numbers have opted out.

The enriched feeds go into three data managers: networking, marketing, and measurement.

In one embodiment, the networking reports 2010 account for all users. So for instance, total data consumed shows data for all users. Similarly, all locations are monitored—only user 1 goes to location 3, which is captured. Page Views (PVs) and Unique Visitors (UVs) account for all users. As far as URLs go, all user activity is monitored. This allows the carrier network planning team to know, for instance, full usage patterns to plan caching architectures.

In one embodiment, the marketing reports 2020 allow a user's total use to be captured, but not the destination. Usage by data plan type, device, location, etc can account for all users. However, when it comes to URLs, only those users that have not opted out are accounted for. As shown in the figure, URL1 is shown with only 3 PVs and 2 UVs, whereas there were a total of 5PVs and 3 UVs across all users.

Depending on the requirement, other options are also possible. For instance, in one embodiment, measurement reports may ask to delete all data related to user 1. So, for instance, the report would show only 2 UVs while the location3 might show no data since user 1 is not measured.

These settings are managed through the Privacy UI controls described earlier. It is expected that the business user selects the high-level control asking for opt-out users to be excluded. This information is then mapped into a specific data manager defining the aggregations that need to be excluded with opted out users. Once specified, the information is disseminated to all Data Managers.

If the carrier maintains a data base of opted out users, this list is expected to be made available to the preferred embodiment's platform for enforcement.

Figure 22:
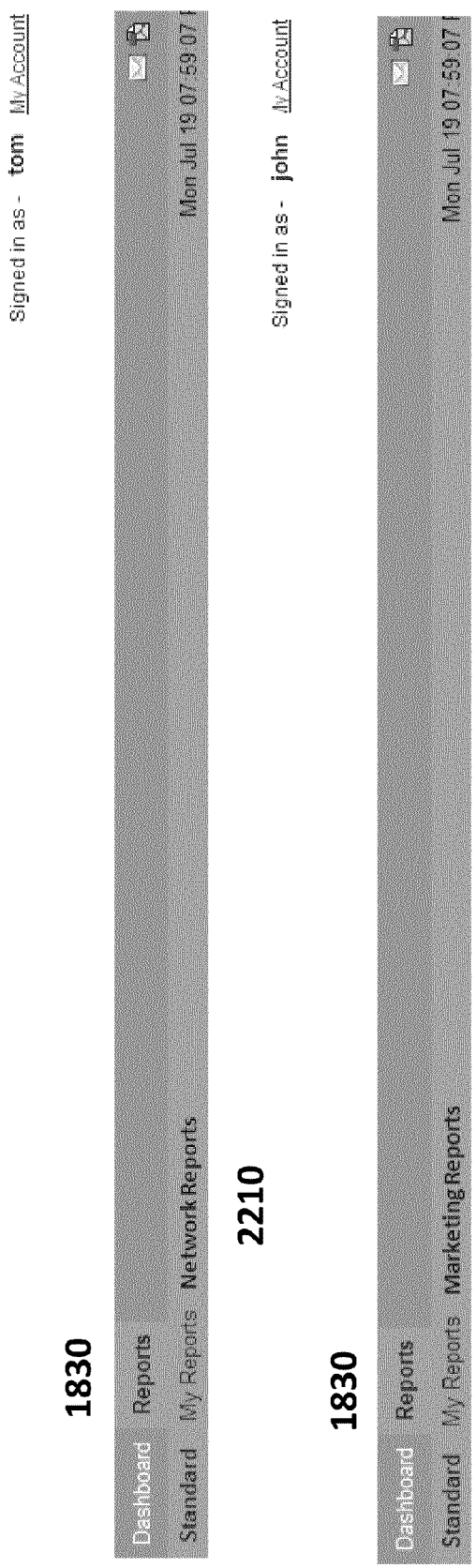
FIG. 22 shows an example of Access controls of the Privacy Dial.

Finally, within the carrier analytics usage, a full set of role based access controls define the reports that are made available to users within organizations. Specifically, the Report Manager supports access groups to subset the report functionality. In one embodiment, all users would be granted access to a baseline set of reports and, optionally, to a set of reports specific to their responsibilities. To this end, users would be associated with an access group and all users in that access group would have access to the same reports. FIG. 22 shows how the navigation tab bar might appear to two users, 2210 and 2220, belonging to two different access groups. User 2210, or Tom, has access to the Standard Reports, reports he has created and saved to My Reports, and Network Reports since he is in the networking team. Other users in the networking team would have access to the same Standard and Network Reports. Each user can create their specific reports from the reports in the Standard and Network Reports libraries and save them to My Reports. On the other hand, user 2220, or John, is in the marketing team and has access to the same Standard reports and a set of Marketing Reports instead of the Network Reports.

Definition and maintenance of access groups and reports within each group is done by the Carrier, through an easy to use interface.

Figure 23:
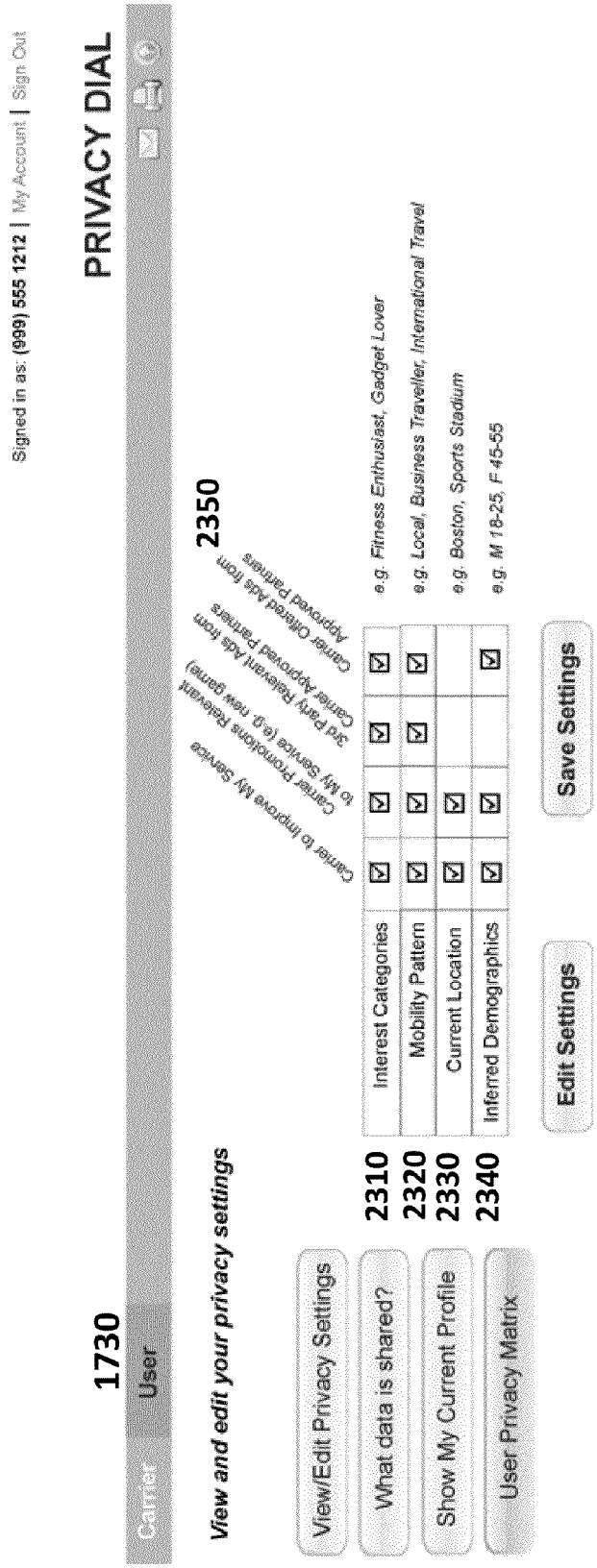
FIG. 23 illustrates the User controls of the Privacy Dial.

FIG. 23 shows how user controls are described. As shown in the figure, users can select which type of data is used for which purpose. Specifically, Interests 2310, Mobility 2320, location 2330 or demographics 2340 can be used in different scenarios 2350—for instance, carrier promotions and third party advertisements.

Figure 24:
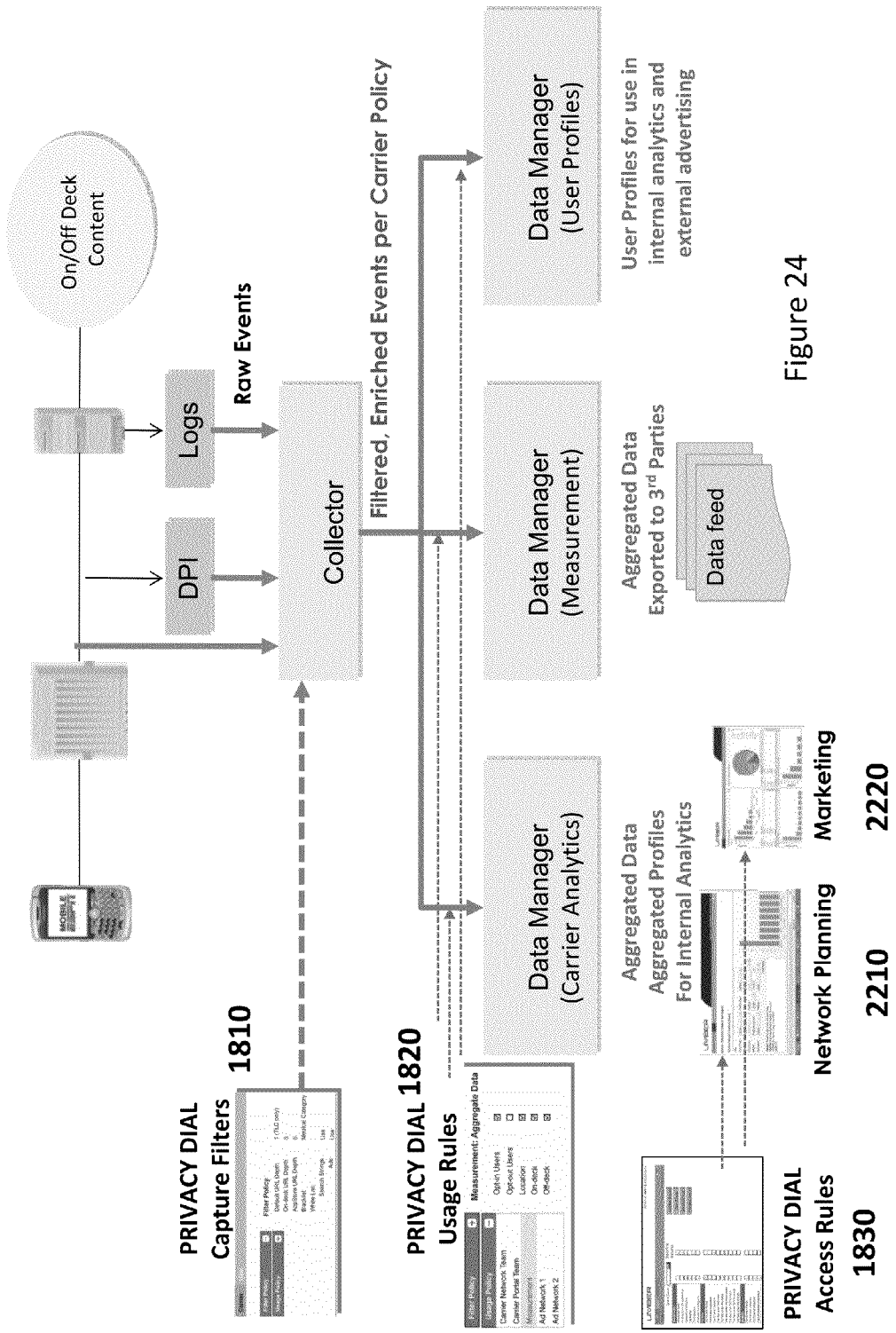
FIG. 24 illustrates how the privacy controls overlay on the components of the solution.

FIG. 24 summarizes how these different privacy setting are applied in the preferred embodiment. As shown below, the preferred embodiment receives data from multiple sources, including logs, external DPI, or its own collection engine. Regardless of the data collection approach, it is possible to apply filters before data is actually used in the system. This is defined by Capture Filter rules 1810. As shown by Capture Filter rules 1810 in the diagram, the carrier can control access to data being captured into the system. This guarantees that only that data that fits these rules ever gets stored in any form in the system.

Once data is brought into the system, usage control is enforced by the Usage Rules 1820. For instance, the Carrier Analytics Data Manager in one embodiment may only receive Aggregated Data and the relevant rules are applied when aggregating data. Similarly, Measurement Data Manager in another embodiment may only process data based on its rules. For instance, Location aggregation by cell-sector may be allowed for the Carrier Analytics solution, while aggregation only by Designated Market Area (DMA) may be allowed for the Measurement solution. Similarly, User profiles analytics can be controlled by its own policies. For instance, search strings may not be aggregated for this application, while they may be ok for carrier analytics. The system is designed to be flexible where key parameters are grouped into user-friendly categories. The privacy dial in the preferred embodiment can be controlled and audited by any non-technical resources in the carrier organization.

Finally, the Access rules 1830 define how different users within the carrier organization get access to reports from the Report Manager.

Carriers may deploy multiple Collector types (Network, Log (supports DPI), SMS, and Agent) in any combination to meet their business needs, and may deploy these either adjacent to their data sources, or in a centralized location.

Additionally, Carriers may deploy Data Managers only centrally via a Central Data Manager (CDM), or also with Local Data Managers (LDMs) deployed at/near the Collectors.

1. Local Data Manager: The Local Data Manager receives enhanced events from a Collector, and performs preliminary data aggregation. It then forwards these aggregates to the Central Data Manager for final aggregation. This is an optional unit in the deployment architecture. Deployment of LDMs reduces network traffic between the Collector and the CDM, by performing aggregation at the "edge." In addition, it helps distribute processing load onto distributed systems.
2. Central Data Manager: The Central Data Manager aggregates all received data (either enriched events from Collectors or aggregates from LDMs) to create the "big picture. The CDM stores all system aggregates, is the central point of data access, and applies the defined access control for different users.

Note also that aggregation can be primarily thought of at two different levels—user level and aggregate level. User level aggregation still reduces events, but maintains a profile with several variables at each user level. Aggregate level is used to refer to aggregation by content, location, and other such dimensions across all users. The following descriptions describe these two types of aggregations to highlight the different processing involved.

Based on these different combinations, the preferred embodiment can use at least three different architectures.
1. Network Collectors with LDMs and CDM: In this mode, HTTP headers, as well as other protocols, are captured and processed to produce raw events. Once data is collected, it is further correlated and enriched. In this design, capture filters are enforced at the Collection point. Analytics are performed by the Local Data Managers (LDMs) at each deployment point. These LDMs help in compressing data before it is sent centrally as well as assist in distribution of computation to each node. Once aggregated, the data is sent to the Central Data Manager (CDM). The CDM performs further analytics and depending on the application, appropriate data is made available. Usage filters are enforced at the CDM and applied as data is used by different applications. Finally, the Reports Manager access is controlled via the Access Control policies.

2. With third party DPI output and LDMs and CDM: In this mode, data is received from existing DPI vendors. Collectors may be deployed alongside existing DPI to do additional enrichment and filter controls, depending on the ability of existing DPI vendors. Further, depending on the level of aggregation done by the DPI vendors, Local Data Managers can optionally provide additional content as well as user level aggregation at each local node. Aggregated data is then fed to the CDM. Capture filters are enforced at the Collector level. Usage filters are applied centrally. The additional aggregation at the distributed locations can substantially reduce the amount of data transferred across locations. It also distributes computation and aggregation load across multiple sites, thereby increasing the response time of the actual applications from the central locations. The CDM can then process data to generate analytics applications as in the case above.

3. Log output: In this mode, it is assumed that event data is already made available centrally. In this case, Collectors may be deployed centrally to do additional filtering if the existing logs don't support the required filter controls. The filtered data is then enriched and sent to the Central Data Managers. Note that for performance optimization it may be possible to distribute data management capabilities into centrally located pipelined and parallelized LDMs, which would then feed into a CDM.

Figure 25:
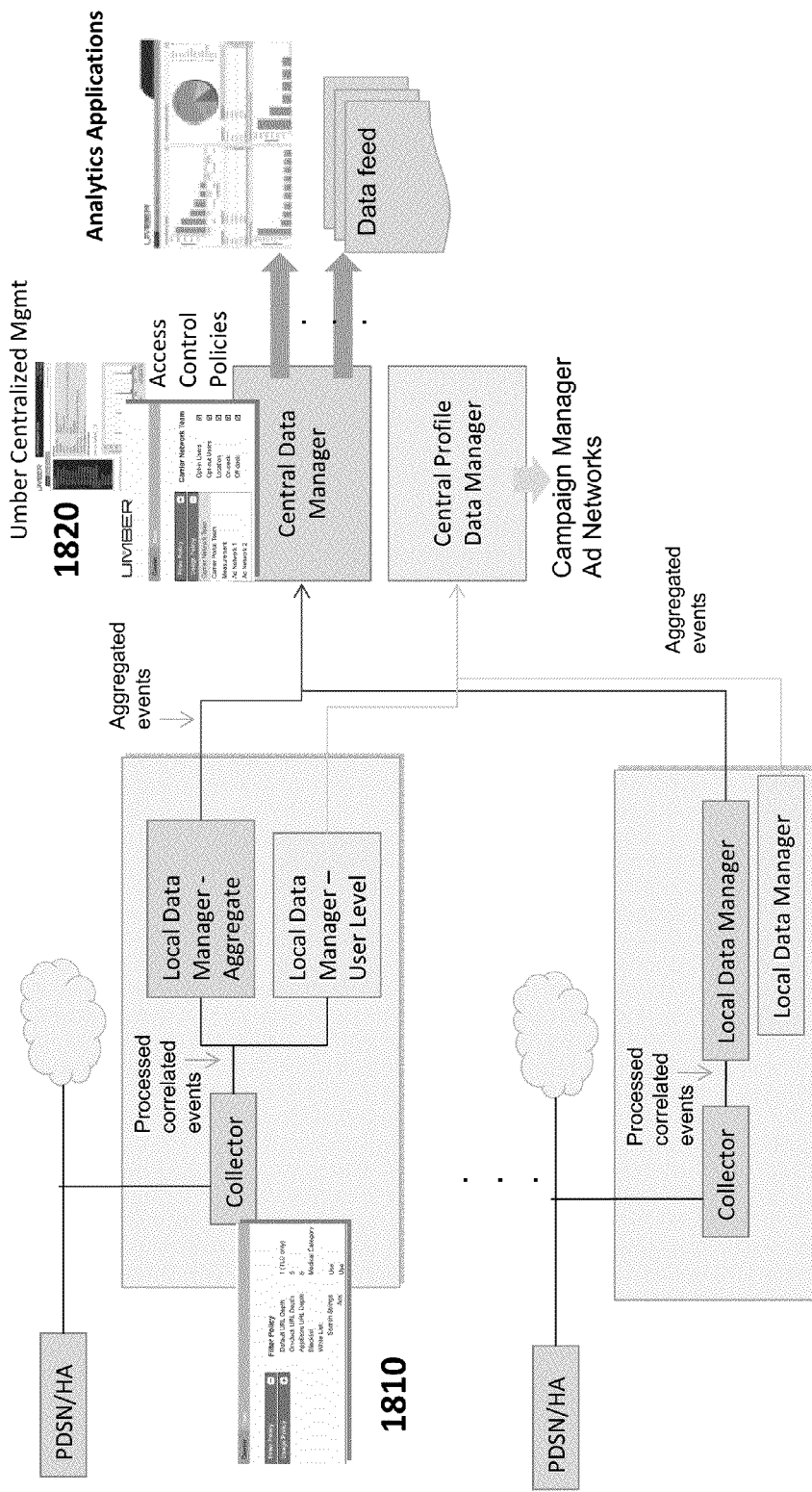
FIG. 25 shows a distributed architecture of the deployment.

Option 1: Network Collectors with Local Data Managers and a Central Data Manager FIG. 25 above shows the deployment architecture in some detail. Individual Collectors are deployed at each site. Each Collector is capable of processing multiple 10G input lines. They correlate and reduce raw transactions into 'events', as described earlier. These reduced events are then further enriched. The optional Local Data Managers perform local aggregation before transmitting to the central location. The final aggregation is done centrally. The capture controls 1810 are applied at each collection point, while the usage controls 1820 are applied centrally.

Figure 26:
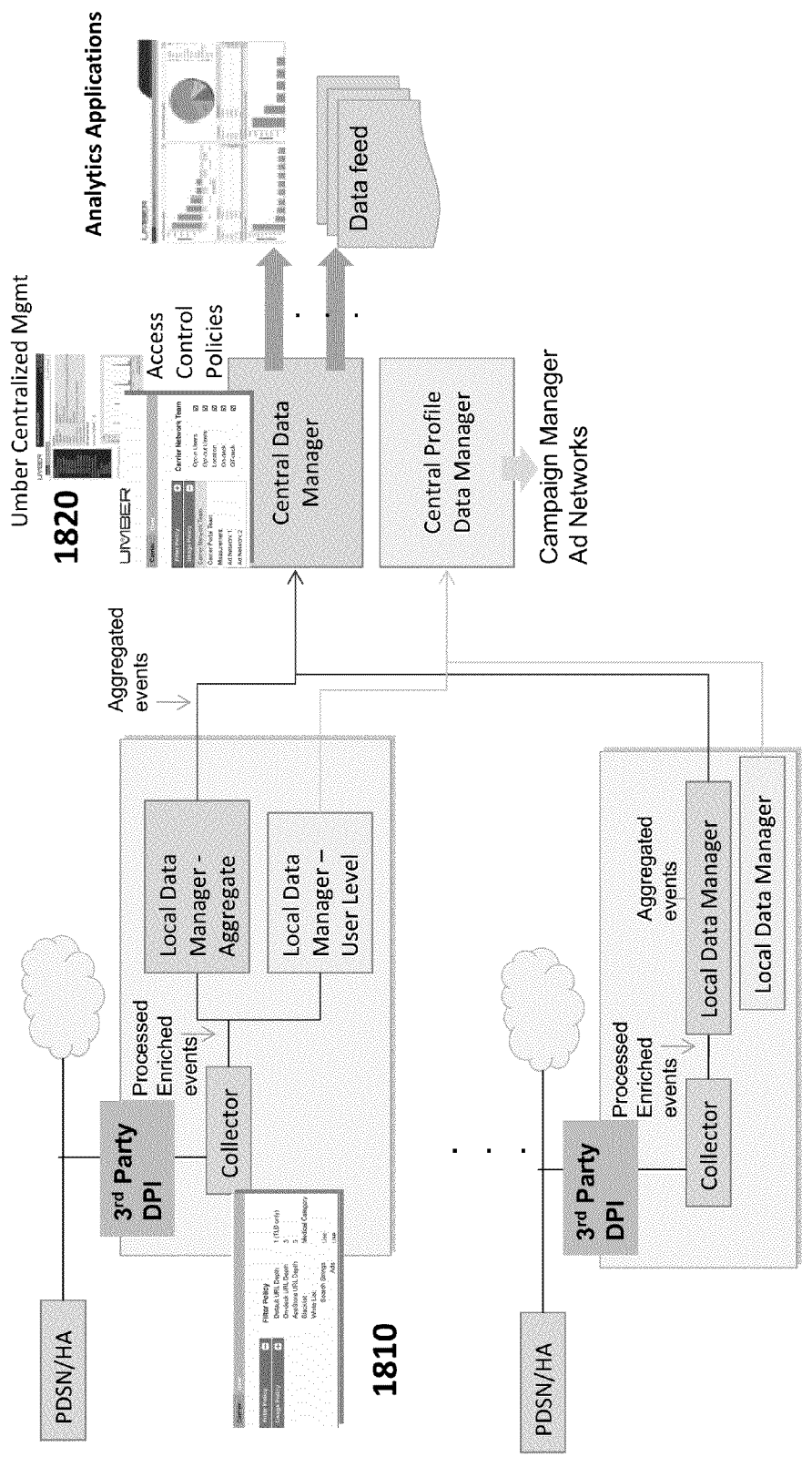
FIG. 26 shows a distributed architecture that works in conjunction with existing DPI vendors.

Option 2: With Third Party DPI, with Local Data Managers and a Central Data Manager This is an alternative solution that allows carriers to use their existing DPI vendor, while getting the benefits of the preferred embodiment's aggregation and analytics capabilities. The difference from Option 1 is that the collection is done by a third party system. As shown in the FIG. 26, the output of the DPI vendor can be fed to the Collectors. Collectors would apply the required Filter policy and correlate, reduce, and enrich data as required. In this case, even if another system is doing the actual capture, the collectors in the preferred embodiment apply the capture controls 1810 so only permitted data is used by the system. The Local Data Managers allows data to be aggregated before sending to the central location, where other applications will be deployed on this data. The capture controls 1810 are applied at each collection point, while the usage controls 1820 are applied centrally.

Option 3: Log Collectors with Centralized Data Management

Figure 27:
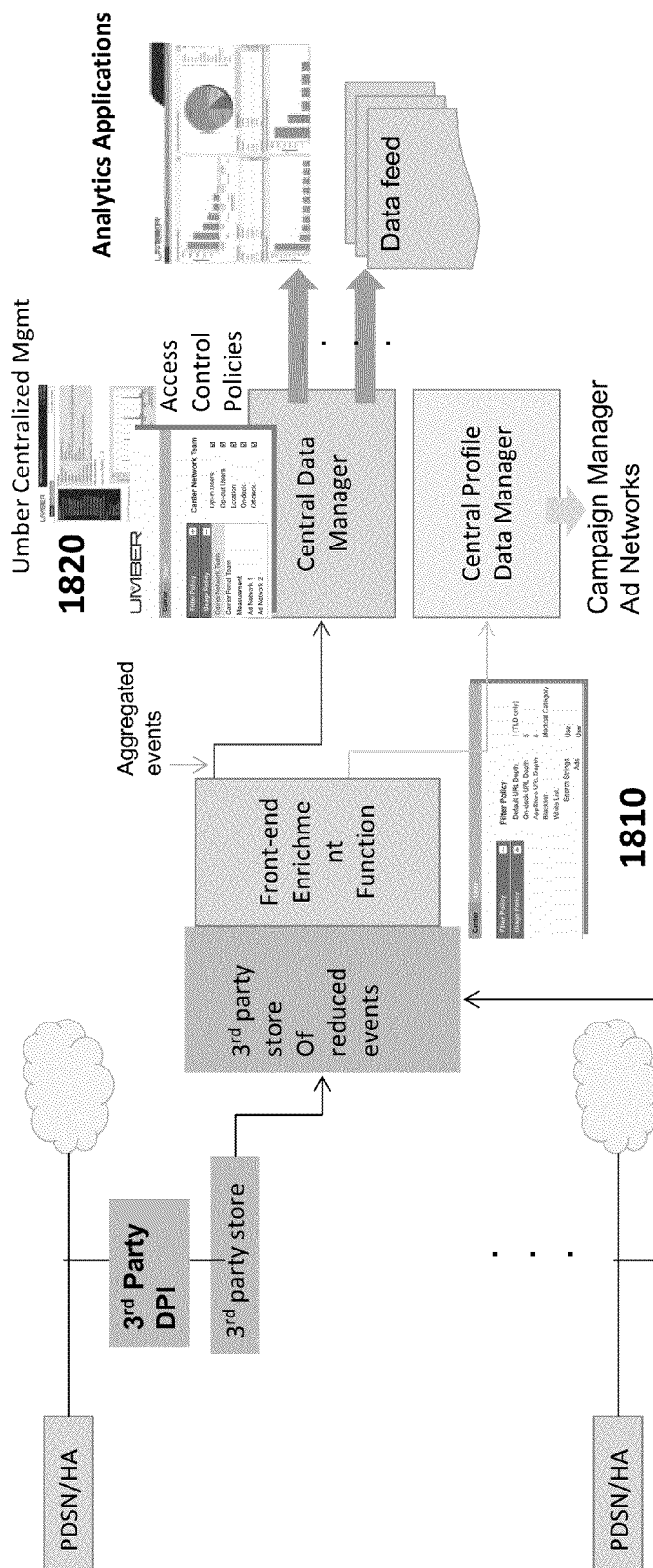
FIG. 27 shows a centralized deployment architecture that works in conjunction with existing logs.

This mode allows a carrier to work with a different vendor for Data collection, while the preferred embodiment can provide the analytics and privacy control capabilities. As shown in the FIG. 27 other systems capture data and bring it centrally. Some form of centralized Collectors are required to filter and enrich the data before being used by the applications. In this case, capture controls 1810 are applied centrally. After some front end data enrichment, the Privacy Dial can then be used to control the output of this data into the multiple applications as described earlier through usage controls 1820.

Figure 28:
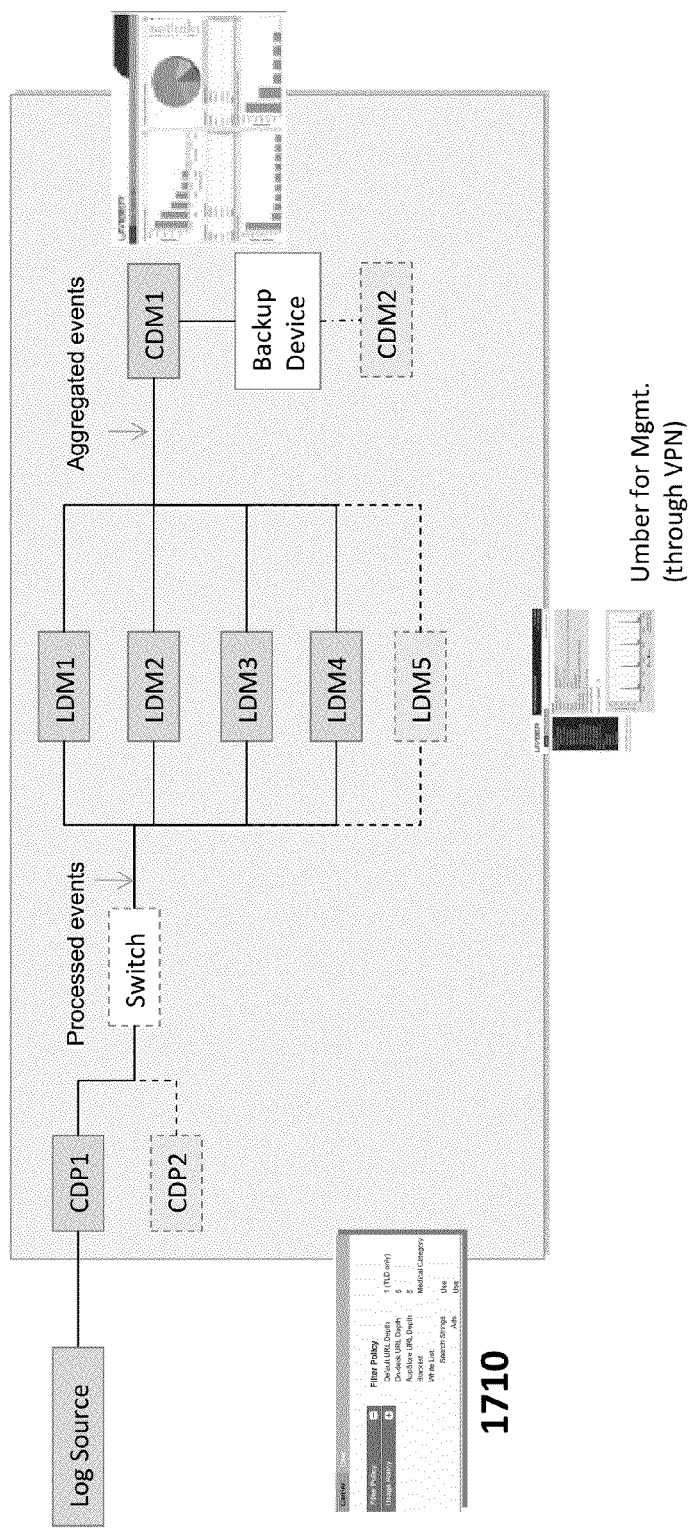
FIG. 28 shows details on a redundant architecture for a log based solution.

FIG. 28 shows more details on the N+1 redundancy architecture. The Privacy Dial 1710 allows controls to be applied to different components in the system through a single management console.

Figure 29:
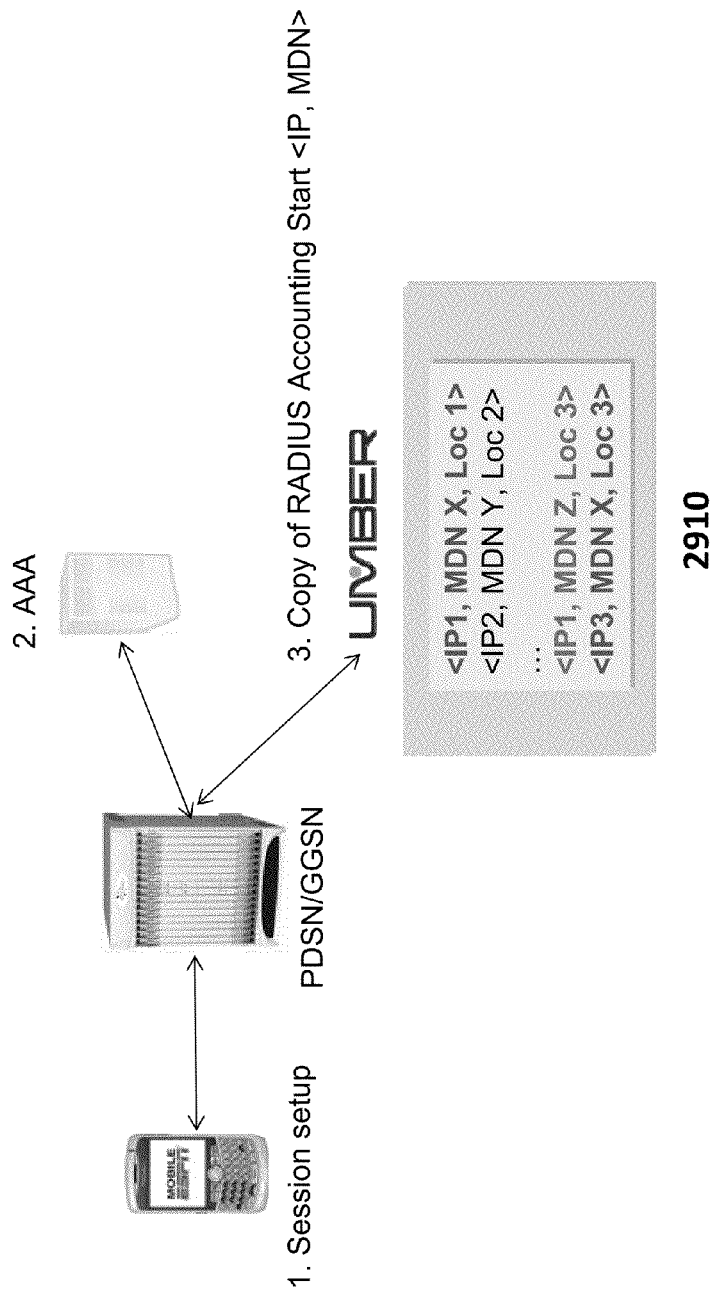
FIG. 29 shows correlation of RADIUS information with usage information.

FIG. 29 shows correlation of the phone number to current IP address by monitoring RADIUS feeds. In concept, the idea is to maintain a current map of a user's dynamic IP with its static phone number (hashed). The preferred embodiment employs a secure way hash to store the phone numbers, and can associate profiles to these hashed phone numbers. This approach allows carriers to change IPs frequently while having the ability to share information in real-time. The user privacy controls 2910 are applied when deciding whether a user's profile can be shared with the right advertising application.

Figure 30:
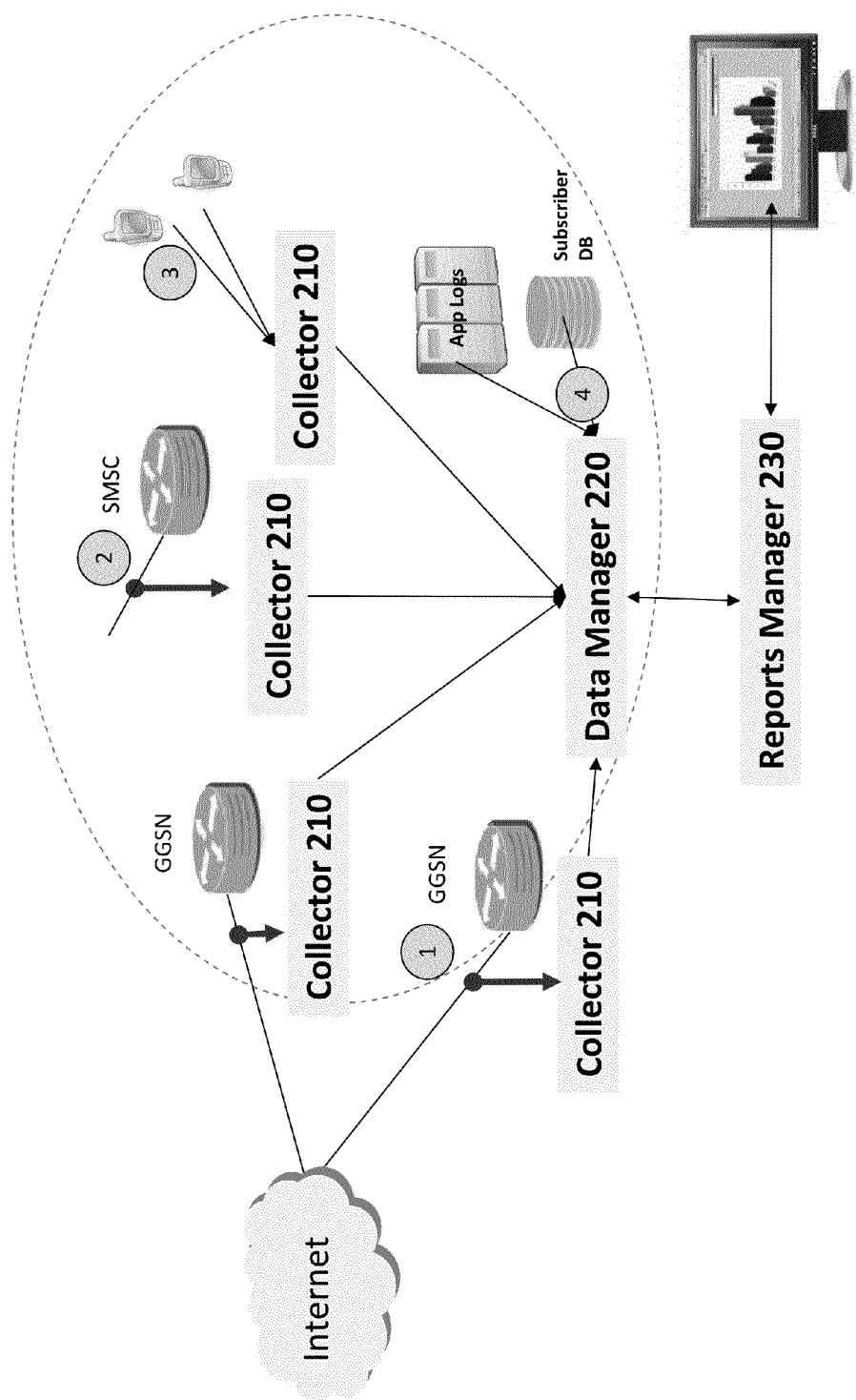
FIG. 30 shows an example of several components in the platform architecture.

FIG. 30 shows an exemplary architecture of the collectors, data managers, and reports manager on a mobile data network.

1. Collector 210: This is the network element that collects data off the physical network segment. Collectors 210 can be deployed at the output of the GGSN/PDSN/HA. A typical deployment will have multiple collectors, typically one per GGSN/PDSN/HA. Collectors 210 also include logic for capturing IP addresses and mapping them to corresponding phone numbers. Additional details on this technique are described in U.S. patent application Ser. No. 12/324,672, U.S. patent application Ser. No. 12/324,675, U.S. patent application Ser. No. 12/324,671, U.S. patent application Ser. No. 12/324,611,U.S. patent application Ser. No. 12/412,273, and U.S. patent application Ser. No. 12/412,276, all of which are incorporated by reference.

2. Data Manager 220: This is the centralized store getting data from multiple collectors 210. Data Manager 220 includes logic for using the phone number from the IP address-mobile phone number pair received from collectors 210 to query a carrier for additional information. Additional details on this technique and examples of various types of carrier information that can be obtained are described in U.S. patent application Ser. No. 12/324,672, U.S. patent application Ser. No. 12/324,675, U.S. patent application Ser. No. 12/324,671, U.S. patent application Ser. No. 12/324,611,U.S. patent application Ser. No. 12/412,273, and U.S. patent application Ser. No. 12/412,276, all of which are incorporated by reference. Once the Data Managers 220 augment the received data with various types of carrier information, the usage control policies specify the data and carrier information that each Data Manager 220 can aggregate in its reports based on the applications being used in each Data Manager 220.

3. Reports Manager 230: The Reports Manager provides the user interface and associated logic to provide the reports. The Reports Manager is accessed by people within a service provider or content provider through a thin client interface.

In the preferred embodiment, all the elements will reside within the service provider network. Specifically, the servers for the Collectors, Data Managers, and Reports Manager may be deployed in an operator datacenter. Collectors will typically be physically co-located with GGSN or PDSN/HA servers. The Data Manager and Reports Manager may be deployed in a central data center. Other deployment architectures are possible where the Data Manager and Reports Manager may be externally deployed outside the operator network or hosted by a third party data center. Other implementations are also possible.

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

Figure 31:
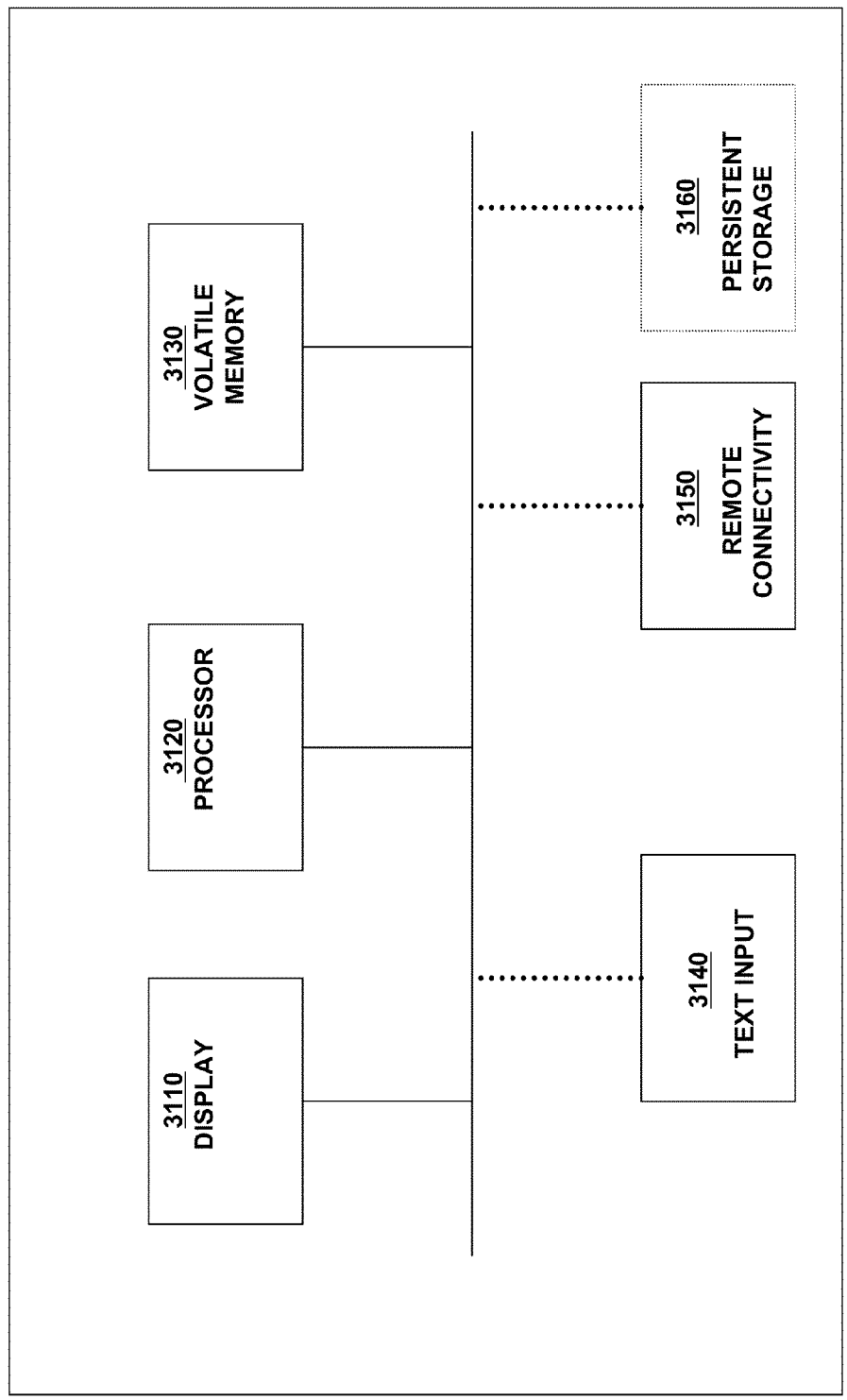
FIG. 31 illustrates an example of the preferred embodiment incorporated into a computer system.

It will be apparent that the Collectors, Data managers, and Report manager can be used as a computer system. Referring to FIG. 31, one embodiment includes a display 3110, a processor 3120, a volatile memory 3130, a text input interface 3140 which is on-device, remote connectivity 3150 to a server through a network, and a local persistent storage 3160. The persistent storage 3160 may be a removable storage element, such as SD, SmartMedia, CompactFlash card etc.

While given components of the system have been described separately, one of ordinary skill also will appreciate that some of the functions may be combined or shared in given instructions, program sequences, code portions, and the like.

I claim:

1. A platform for real-time, non-intrusive transparent monitoring of application-level data activity from user mobile devices on a mobile data network so that data can be captured, analyzed, and accessed by an operator based on a plurality of privacy controls, the platform comprising:

a plurality of collectors distributed through the mobile data network, each collector corresponding to and being in communication with a corresponding router in the mobile data network to receive data communications from the user mobile devices via the router, the data communications including a uniform resource locator (URL), wherein each collector is responsive to a plurality of capture filter rules that specify collected data to be retained, each collector inspecting the retained communications of the user mobile devices to detect source IP addresses and correlating the retained communications with phone numbers associated with the user mobile devices, wherein the capture filter rules include analyzing a first segment of the URL, and determining whether to retain a second segment of the URL based on the analysis of the first segment of the URL;

a plurality of data managers receiving the communications and the correlated phone numbers from the plurality of routers, each data manager using a corresponding phone number for each communication to query additional information associated with the phone number, each data manager analyzing the communications and the associated additional information to provide information to satisfy parameters of a plurality of defined real-time reports, the real-time reports providing real-time information on aggregated usage of the network, wherein each data manager is responsive to a plurality of usage filter rules that specify the communications and associated additional information that can be aggregated in the defined real-time reports in each data manager;

a report manager, cooperating with the data manager, to provide a set of defined real-time reports in response to operator instructions, wherein the report manager is responsive to a plurality of access filter rules that specify the reports that can be provided to the operator;

wherein the access filter rules specify the real-time reports that can be provided to the operator based on a plurality of rights given to a plurality of groups, wherein the operator is included in the plurality of groups;

wherein the access filter rules specify a baseline set of real-time reports that can be provided to the operator and any of the plurality of groups.

2. The platform of claim 1 wherein the capture filter rules include at least one of URL default depth, on-deck URL depth, app store activity, black lists, and white lists.

3. The platform of claim 2 wherein the white list includes at least one of selective URL depth, ad networks, search strings, and referrers.

4. The platform of claim 3 wherein the selective URL depth can be selectively turned on for a specific duration of time or for a specific event.

5. The platform of claim 1 wherein the usage filter rules specify the communications and associated additional information that can be aggregated in each data manager based on a plurality of applications associated with each data manager.

6. The platform of claim 5 wherein the usage filter rules allow an end user to remove a subset of information from the communications and associated additional information that satisfy the usage filter rules before the data managers aggregate the communications and associated additional information, the subset of information being specific to the end user.

7. The platform of claim 6 wherein the usage filter rules allow the end user to remove the subset of information from being aggregated in at least one application, the subset of user information being aggregated in remaining applications requiring the subset of user information.

8. The platform of claim 1 wherein the access filter rules specify the real-time reports that can be provided to the operator based on a plurality of rights given to a group, wherein the operator is included in the group.

9. The platform of claim 1 wherein granularity of at least one of the capture filter rules, usage filter rules, and access filter rules can be adjusted to filter more or less data.

10. The platform of claim 1 wherein the collectors capture data from a plurality of sources including at least one of off-deck websites, on-deck websites, web applications, video applications, apps, and messaging.

* * * * *